United States Patent
Sukegawa et al.

(10) Patent No.: US 7,814,785 B2
(45) Date of Patent: Oct. 19, 2010

(54) THERMAL FLOW METER, THERMAL FLOW METER CONTROL METHOD, AND SENSOR ELEMENT OF THERMAL FLOW METER

(75) Inventors: Yoshihiro Sukegawa, Hitachi (JP); Noboru Tokuyasu, Hitachinaka (JP); Hiroaki Hoshika, Hitachiomiya (JP); Kaori Kashio, Sakura (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 12/242,347

(22) Filed: Sep. 30, 2008

(65) Prior Publication Data
US 2009/0090177 A1    Apr. 9, 2009

(30) Foreign Application Priority Data
Oct. 3, 2007   (JP) ............... 2007-260187

(51) Int. Cl.
G01F 1/68   (2006.01)
(52) U.S. Cl. .................................. 73/204.27
(58) Field of Classification Search .............. 73/204.26, 73/204.27, 204.25; 123/568.21
See application file for complete search history.

(56) References Cited

U.S. PATENT DOCUMENTS 7,726,187 B2 *   6/2010   Sukegawa et al. ........ 73/204.27
2008/0295590 A1*  12/2008  Sukegawa et al. ........ 73/204.26
2009/0223495 A1*  9/2009   Ohata et al. ............ 123/568.12

FOREIGN PATENT DOCUMENTS

| JP | 59-136620 A2 | 8/1984 |
| JP | 2007-285756 A | 1/2007 |
| JP | 2007-248136 A | 9/2007 |
| JP | 2008-032501 | 2/2008 |

* cited by examiner

Primary Examiner—Jewel Thompson
(74) Attorney, Agent, or Firm—Crowell & Moring LLP

(57) ABSTRACT

A thermal flow meter corrects flow rate detection errors produced by vaporization of liquid phase components included in a gas to be measured. The thermal flow meter includes a correction circuit 500 that applies respectively different predetermined voltages to heating resistors consisting of first heating resistor Rh1 and second heating resistor Rh2 of a sensor element disposed in the gas to be measured to set a first temperature state and a second temperature state, calculates a first flow rate value Q1 of the gas to be measured in the first temperature state and a second flow rate value Q2 of the gas to be measured in the second temperature state, and calculates a flow rate correction value $\Delta Q$ based on a ratio (Q1/Q2) between the first flow rate value and second flow rate value or a fourth-power value $(Q1/Q2)^4$ of the ratio to correct a flow rate of the gas to be measured.

18 Claims, 19 Drawing Sheets

- S1 — Read In $V_{R3}$
- S2 — Calculate temperature Tg of gas to be measured
- S3 — Calculate setting temperature of heating resistor
  Th1 = Tg+ΔT1, Th2 = Tg+ΔT2
- S4 — Control duty ratio that is output to heater driving circuit
- S5 — Calculate Q1 and Q2
- S6 — Calculate flow rate correction amount ΔQ
- S7 — Output post-correction flow rate Q = Q1-ΔQ FIG. 18
FIG. 19
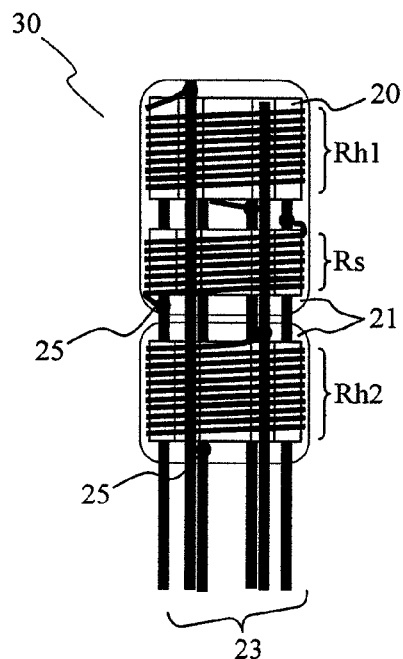
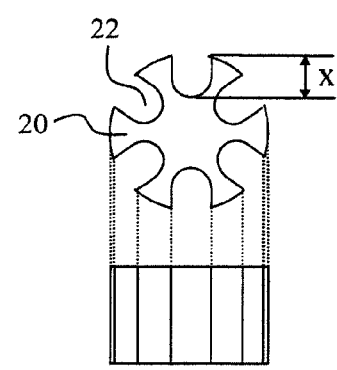
FIG. 20
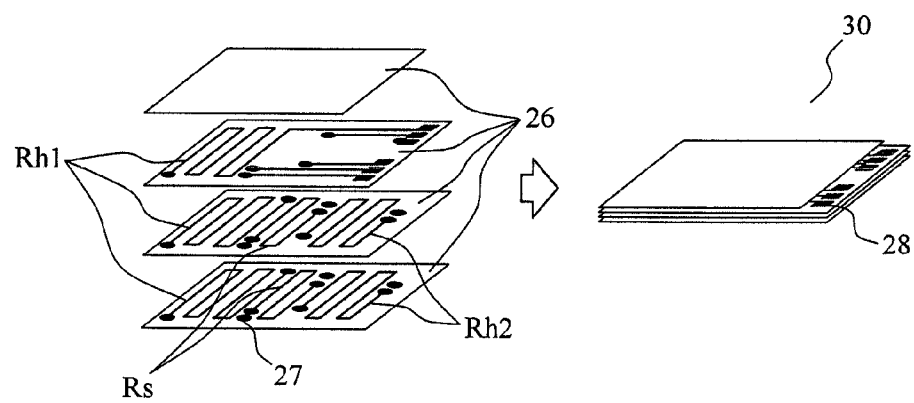

Forward flow direction

Flow of gas

Cooling water

ND SENSOR
THERMAL FLOW METER, THERMAL FLOW METER CONTROL METHOD, AND SENSOR ELEMENT OF THERMAL FLOW METER

BACKGROUND OF THE INVENTION

1. Field of the Invention

The present invention relates to a thermal flow meter, a thermal flow meter control method, and a sensor element of a thermal flow meter. More particularly, the present invention relates to a thermal flow meter that is suitable for detecting the flow rate of the intake air or exhaust gas of an engine, a method of controlling the thermal flow meter, and a sensor element of the thermal flow meter.

2. Background Art

Conventionally, as this kind of thermal flow meter, at least two resistors are arranged in a fluid, as illustrated in FIG. 28. One of the resistors is used as a resistance temperature detector that detects the temperature of the fluid, and the other is used as a heating resistor that detects a flow rate. By always maintaining the respective temperature differences ($\Delta Th$) constant, measurement of the mass flow rate of the fluid can be carried out.

Further, as a conventional thermal flow meter, a fluid flow rate measuring device has been proposed that measures a flow rate of a fluid, particularly an airflow rate that is necessary for combustion in an internal-combustion engine, using at least two temperature-dependent resistors that are disposed in the fluid, which is provided with two resistance measuring circuits, in particular, bridge circuits, that are each connected to a temperature-dependent resistor. In this fluid flow rate measuring device, the temperature-dependent resistors that are connected to each bridge circuit are caused to generate heat of respectively different predetermined temperatures (for example, see Patent Document 1).

[Patent Document 1] JP Patent Publication (Kokai) No. 59-136620A (1984)

SUMMARY OF THE INVENTION

However, when measuring the flow rate of exhaust gas of an engine using a thermal flow meter with the aforementioned structure and the flow rate measuring device described in Patent Document 1, there are many cases in which liquid components such as oil, unburned fuel, and water are included in the exhaust gas of the engine. If these liquid components adhere to a heating resistor of the thermal flow meter, a significant flow rate detection error arises. More specifically, liquid components that adhere to the heating resistor receive heat from the heating resistor and vaporize. Since the vaporized latent heat takes heat away from the heating resistor at this time, a flow rate error is caused.

First, the principles of a thermal flow meter will be briefly described using FIG. 28 and FIG. 29 that illustrate a conventional thermal flow meter. FIG. 28 is a view that illustrates the configuration of a common thermal flow meter. In a thermal measurement method, at least two resistors are disposed in a fluid. One of the resistors is used as a resistance temperature detector that detects the temperature of the fluid, and the other is used as a heating resistor that detects the flow rate. By always maintaining the respective temperature differences ($\Delta Th$) constant, measurement of the mass flow rate of the fluid can be carried out. For example, in the case of an intake air flow meter of an engine, $\Delta Th$ is generally set to approximately 100 to 200° C. based on a comprehensive decision that takes into account factors such as measurement accuracy, responsiveness, prevention of contamination caused by dirt and the like, and the durability or heat resistance of the materials used.

FIG. 29 is a view that illustrates the configuration of a bridge control circuit. The heating resistor and resistance temperature detector are arranged as bridge-circuit resistors. When the resistance of the heating resistor is taken as Rh and a current flowing through the heating resistor is taken as Ih, then the entire heating value Ph of the heating resistor, the mass flow rate $\rho U$ of a fluid flowing in the heating resistor, and $\Delta Th$ are represented by equation (1).

[Equation 1]

$$Ph = Ih^2 Rh = (A + B\sqrt{\rho U})\Delta Th \qquad (1)$$

Here, A represents the amount of heat conduction (heat leakage) from the heating resistor to a support element and B represents the amount of heat transfer that is lost to the fluid, and these are can be brought together as a thermal constant. Based on equation (1), it is found that a voltage Vs of a midpoint between the heating resistor Rh and a fixed resistor R1 is represented by equation (2), and is a voltage that depends on the mass flow rate of the fluid. A sensor output Vout is amplified and output as an analog voltage value.

[Equation 2]

$$Vs = R1 \cdot Ih = R1 \sqrt{\frac{1}{Rh}(A + B\sqrt{\rho U})\Delta Th} \qquad (2)$$

An example that illustrates the relationship between the sensor output Vout and the fluid mass flow rate $Q(=\rho U)$ is shown in FIG. 30. As shown in equation (2), the fluid mass flow rate Q is in proportion to a $4^{th}$ power of the sensor output Vout. Hence, by measuring the sensor output voltage Vout, the mass flow rate Q of fluid flowing over the sensor surface can be obtained using equation (2) or the relation shown in FIG. 30. This describes the measurement principle of a thermal flow meter.

Next, the cause of an error occurrence in a thermal flow meter is described. In a case in which liquid phase components such as droplets or non-vaporized fuel are included in gas to be measured, the liquid phase components in the gas adhere to the surface of the heating resistor Rh as shown in FIG. 31. Since a heating resistor is generally kept at a temperature that is approximately 100 to 200° C. higher than the gas to be measured, the liquid phase components that adhere to the surface of the heating resistor receive heat from the heating resistor and evaporate. At this time, vaporized latent heat is taken from the surface of the heating resistor and the heating resistor Rh cools. As described previously, since a thermal flow meter detects a flow rate based on a cooling heat amount produced by heat transfer of a fluid, if extra cooling occurs because of vaporized latent heat, the thermal flow meter will indicate a flow rate value that is greater than the actual flow rate. This is one cause of error occurrence in a thermal flow meter.

Next, a specific error occurrence mechanism is described for a case that assumes a thermal flow meter is used to detect the exhaust gas flow rate of an engine. In engine control, in some cases the engine is operated after making the air-fuel ratio (ratio of air to fuel) inside the combustion chamber richer in fuel than the theoretical mixture ratio. Such cases include, for example, a case of regenerating a NOx adsorption catalyst in an engine that comprises a NOx adsorption catalyst for post-treatment of emissions, or a case in which control is performed to increase the amount of fuel to ensure the starting capability at a low temperature in the case of a cold start. In these cases, fuel components that have not been completely burned inside the combustion chamber are included in the exhaust gas. If the temperature of the exhaust gas falls below the boiling point of the fuel because of the release of heat in an exhaust pipe or the like, the unburned fuel in the exhaust gas condenses as liquid phase components in the exhaust gas and comes out. When these liquid phase components adhere to the heating resistor of the thermal flow meter and vaporize, the aforementioned flow rate detection error occurs.

FIG. 32 is a view that illustrates an example of an experimental result that shows flow rate detection errors with respect to air-fuel ratios in measurement of the exhaust flow rate of an engine using a thermal flow meter. This experimental result shows that a large flow rate detection error occurs on a side that is rich in fuel compared to the theoretical air-fuel ratio.

The present invention was made in view of the above described problems, and an object of the invention is to provide a thermal flow meter that can accurately measure the flow rate of a fluid even when liquid components are included in the fluid to be measured, as well as a thermal flow meter control method and a sensor element of a thermal flow meter.

To achieve the aforementioned object, a thermal flow meter according to the present invention applies a voltage to a heating resistor of a sensor element that is disposed in a gas flow to be measured to set the heating resistor to a predetermined temperature state and detects a flow rate value of the gas flow to be measured in the predetermined temperature state that is set, wherein the thermal flow meter corrects a flow rate detection error that is produced by vaporization of liquid phase components included in a gas flow to be measured of the flow rate value based on a value that is calculated using the flow rate value.

A thermal flow meter control method according to the present invention is a method of controlling a thermal flow meter that applies a voltage to a heating resistor of a sensor element that is disposed in a gas flow to be measured to set the heating resistor to a predetermined temperature state and detects a flow rate value of the gas flow to be measured in the predetermined temperature state that is set, wherein the control method performs control to correct a flow rate detection error that is produced by vaporization of liquid phase components included in a gas flow to be measured of the flow rate value based on a value that is calculated using the flow rate value.

According to the thermal flow meter and the thermal flow meter control method of the present invention as described above, even though liquid components included in a gas flow to be measured adhere to a heating resistor and vaporize to thereby cause a flow rate detection error to occur because vaporized latent heat is taken from the heating resistor, it is possible to accurately measure the flow rate of a gas to be measured since the flow rate detection error is corrected in the direction of the actual flow rate value by correction means based on a value that is calculated by performing detection in a predetermined temperature state.

As a preferable specific form of the thermal flow meter according to the present invention, the flow rate value is a plurality of flow rate values that are detected in a plurality of different predetermined temperature states, and the thermal flow meter corrects a flow rate detection error produced by vaporization of liquid phase components included in a gas flow to be measured of one of the flow rate values based on the value that is calculated based on the plurality of flow rate values. Further, as a preferable specific form of the thermal flow meter control method, the control method performs control to detect a plurality of flow rate values in a plurality of different predetermined temperature states, calculate the value based on the detected flow rate values, and correct the flow rate detection error that is produced by vaporization of liquid phase components included in a gas flow to be measured of one of the flow rate values based on the value. According to this configuration, the heating resistor is placed in a plurality of different temperature states, a plurality of flow rate values are detected in the different temperature states, the value is detected based on the plurality of flow rate values that are detected, and the aforementioned flow rate detection error is accurately corrected based on the value that is calculated.

As another preferable specific form of the thermal flow meter according to the present invention, a value that is calculated based on the plurality of flow rate values is a ratio between the plurality of flow rate values. Further, as another preferable specific form of the thermal flow meter control method, the control method performs control to calculate the value based on a ratio between the plurality of flow rate values and correct the flow rate detection error based on the value that is calculated. According to this configuration, since the value is calculated based on a ratio between a plurality of flow rate values that are detected in a plurality of different predetermined temperature states, and a flow rate detection error is corrected based on the value that is calculated, a flow rate can be measured with high accuracy.

According to the thermal flow meter of the present invention, preferably a value that is calculated based on the plurality of flow rate values is an exponential value of a ratio between the plurality of flow rate values. Further, according to the thermal flow meter control method of the present invention, preferably control is performed to calculate the value based on an exponential value of a ratio between the plurality of flow rate values, and correct the flow rate detection error based on the calculated value. According to this configuration, it is possible to correct a flow rate detection error that is produced by vaporization of liquid phase components included in a gas to be measured by using a correction amount that is based on an exponential value, for example, a fourth-power value, of a ratio between the plurality of flow rate values, to more accurately measure the flow rate of a gas to be measured.

In the aforementioned thermal flow meter, preferably the plurality of different predetermined temperature states are temperature states that are produced by differing times of applying a voltage to the heating resistor. Further, in the aforementioned thermal flow meter control method, preferably control is performed to set the plurality of different temperature states by differing times of applying a voltage to the heating resistor and correct the flow rate detection error based on the value that is calculated using a flow rate value at a temperature state that is set. According to this configuration, since, for example, a plurality of different temperature states can be set by staggering times of applying a voltage to a single heating resistor, and a flow rate detection error is corrected using the value that is calculated based on respective flow rate values that are detected in different temperature states, the accuracy of a detected flow rate value can be increased. In this case, since there is a single heating resistor, the configuration is simplified and the amount of required space can be decreased.

In the aforementioned thermal flow meter, preferably the plurality of different predetermined temperature states are temperature states that are produced by applying different voltages to each of a plurality of the heating resistors. Further, in the aforementioned thermal flow meter control method, preferably control is performed to set the plurality of different temperature states by applying different voltages to each of a plurality of the heating resistors, and correct the flow rate detection error based on the value that is calculated using a flow rate value at a temperature state that is set. According to this configuration, since a plurality of different temperature states can be set by applying different voltages to each of a plurality of heating resistors, and a flow rate detection error is corrected by calculating the value based on each flow rate value that is detected in a different temperature state, the accuracy of a measured flow rate value can be increased.

As a further form of the thermal flow meter of the present invention, there is provided a thermal flow meter that applies voltages to a heating resistor of a sensor element that is disposed in a gas flow to be measured to set the heating resistor to a first temperature state and a second temperature state, and detects a first flow rate value of the gas flow to be measured in the first temperature state that is set and a second flow rate value of the gas flow to be measured in the second temperature state that is set, wherein a flow rate detection error produced by vaporization of liquid phase components included in a gas flow to be measured of the first flow rate value or the second flow rate value is corrected based on a ratio between the first flow rate value and the second flow rate value.

As a further form of the thermal flow meter control method of the present invention, there is provided a method of controlling a thermal flow meter that applies voltages to a heating resistor of a sensor element that is disposed in a gas flow to be measured to set the heating resistor to a first temperature state and a second temperature state, and detects a first flow rate value of the gas flow to be measured in the first temperature state that is set and a second flow rate value of the gas flow to be measured in the second temperature state that is set, wherein the control method performs control to correct a flow rate detection error that is produced by vaporization of liquid phase components included in a gas flow to be measured of the first flow rate value or the second flow rate value based on a ratio between the first flow rate value and the second flow rate value.

According to the thermal flow meter and the thermal flow meter control method configured in this manner, since a first flow rate value of a gas flow to be measured in a first temperature state of a heating resistor and a second flow rate value of a gas flow to be measured in a second temperature state are detected, and control is performed to correct a flow rate detection error produced by vaporization of liquid phase components included in a gas flow to be measured based on a ratio between the first flow rate value and the second flow rate value, the measurement accuracy of a detected flow rate can be increased.

As another specific preferable form of the thermal flow meter according to the present invention, the first temperature state and the second temperature state are temperature states that are produced by differing times of applying a voltage to the heating resistor. Further, as another specific preferable form of the thermal flow meter control method according to the present invention, the control method performs control to set the first temperature state and second temperature state by differing times of applying a voltage to the heating resistor, and correct the flow rate detection error. According to this configuration, since control is performed to set a first temperature state and a second temperature state by staggering times of applying a voltage to a heating resistor and correct a flow rate detection error based on a ratio between a first flow rate value and a second flow rate value in these temperature states, it is possible to accurately measure the flow rate of a gas to be measured.

As a further specific preferable form of the thermal flow meter according to the present invention, the first temperature state and the second temperature state are temperature states that are produced by applying different voltages to each of a plurality of the heating resistors. As a further specific preferable form of the thermal flow meter control method according to the present invention, the control method performs control to set the first temperature state and the second temperature state by applying different voltages to each of a plurality of the heating resistors, and correct the flow rate detection error. According to this configuration, since control is performed to set a first temperature state and a second temperature state by applying different voltages to each of a plurality of the heating resistors and correct a flow rate detection error based on a ratio between a first flow rate value and a second flow rate value in these temperature states, it is possible to accurately measure the flow rate of a gas to be measured.

A sensor element of a thermal flow meter according to the present invention comprises a shaft, a first heating resistor and a second heating resistor that are wound around the shaft, a groove that is formed along an axial direction of the shaft, and a support element that is arranged inside the groove, wherein the first heating resistor and second heating resistor are connectedly fixed to the support element and are electrified through the support element.

Preferably, the sensor element of the thermal flow meter according to the present invention further comprises a resistance temperature detector that is wound around the shaft, wherein the resistance temperature detector is connectedly fixed to the support element and is electrified through the support element. According to this configuration, since the sensor element can be unitized, installation thereof is simple and replacement when an abnormality occurs is facilitated.

The thermal flow meter and thermal flow meter control method of the present invention enable accurate measurement of a flow rate when measuring the flow rate with a thermal flow meter when attempting to measure the flow rate of a gas which includes liquid phase components, even when the liquid phase components in the gas vaporize and cause a flow rate error. Further, a sensor element of the thermal flow meter of the present invention can be miniaturized to allow easy installation thereof and also enable easy replacement thereof The present specification encompasses the content of the specification of Japanese Patent Application No. 2007-260187 on which the priority of the present application is based.

BRIEF DESCRIPTION OF THE DRAWINGS

FIG. 18 is a front view of a first embodiment of a sensor element of a thermal flow meter of the present invention.

FIG. 19 is a plane view and a front view of an aluminum pipe comprising the sensor element shown in FIG. 18.

FIG. 20 is an oblique perspective view of a disassembled state of a multilayer substrate-type sensor element that illustrates another embodiment of the sensor element of the thermal flow meter of the present invention, and an oblique perspective view of an assembled state.

DETAILED DESCRIPTION OF THE PREFERRED EMBODIMENTS

Figure 33:
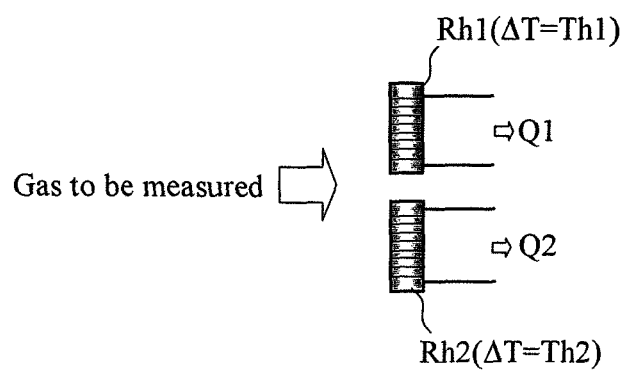
FIG. 33 is a configuration diagram in which two heating resistors are arranged, as a view that describes the principles of correcting a flow rate error according to the present invention.

First, before describing the first embodiment of the present invention, the principles of correcting a flow rate error according to the present invention will be described using FIG. 33 and FIG. 34. In the present invention, two heating resistors (Rh1 and Rh2) are parallelly disposed in a gas to be measured as shown in FIG. 33. A temperature difference between the temperature of the heating resistor Rh1 and the gas is expressed as $\Delta Th1$ and a temperature difference between the temperature of the heating resistor Rh2 and the gas is expressed as $\Delta Th2$, and $\Delta Th1$ and $\Delta Th2$ are set to be different temperatures. The heating resistors Rh1 and Rh2 are respectively connected to an unshown bridge circuit or the like. A flow rate detection value Q1 is detected from the heating resistor Rh1 and a flow rate detection value Q2 is detected from the heating resistor Rh2. Since the two heating resistors are parallelly disposed in the same flow, the respective flow rate detection values are the same (Q1=Q2) when there is no flow rate detection error. In contrast, when liquid phase components such as fuel or water droplets are contained in the gas to be measured, respective errors are produced in the flow rate detection values Q1 and Q2 due to the effects of vaporized latent heat as described above.

Figure 34:
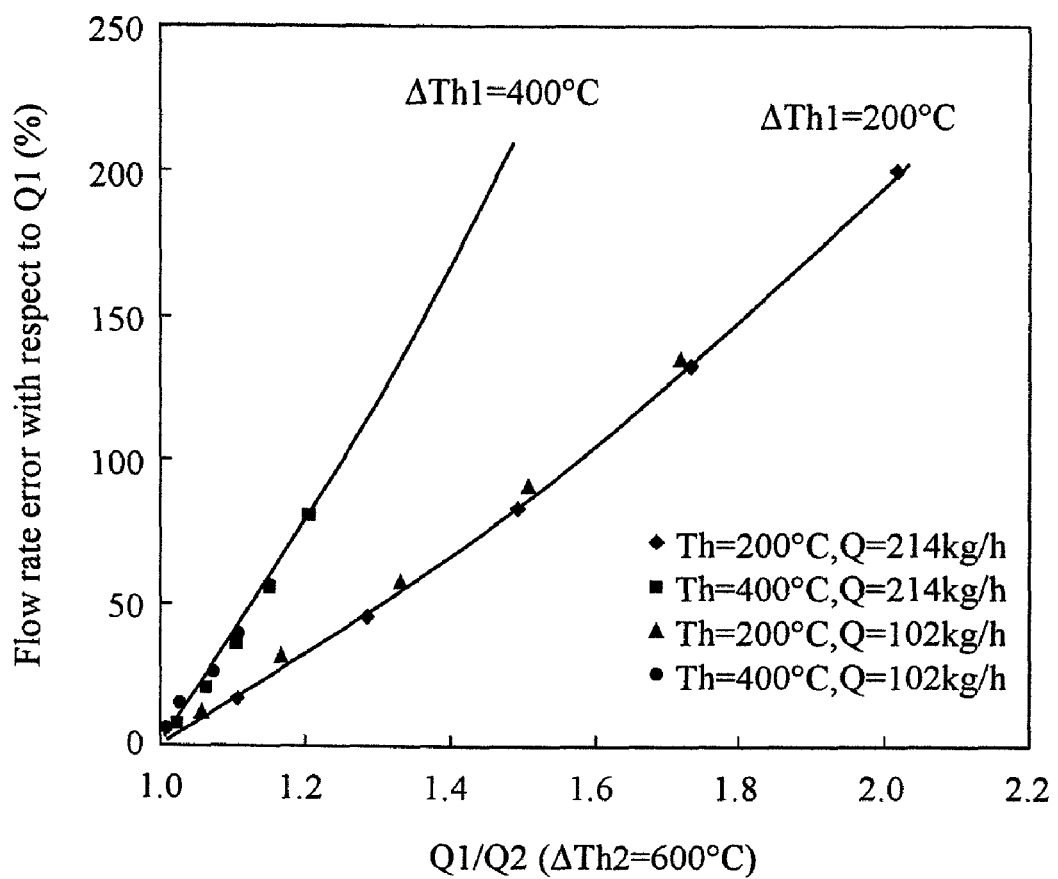
FIG. 34 is a graph that illustrates the relation between flow rate ratios and flow rate correction values, as a view that describes the principles of correcting a flow rate error according to the present invention.

FIG. 34 is a view that illustrates an example showing the relation between a ratio (Q1/Q2) between flow rate values that are detected by the two heating resistors Rh1 and Rh2 and the flow rate error with respect to Q1. Since the setting temperatures of the two heating resistors Rh1 and Rh2 are different, when a flow rate error is produced by a vaporized latent heat effect, the change width in the flow rate values differs between Rh1 and Rh2. It was clarified by tests that, at this time, there is a correlation as shown in FIG. 34 between flow rate errors and the detected flow rate ratio Q1/Q2. More specifically, it was found that, if the temperature differences $\Delta Th1$ and $\Delta Th2$ between the gas and the temperatures of the two heating resistors are decided, even if a gas flow rate that is measured changes, there is a constant relationship between the flow rate detection errors and the flow rate ratio (Q1/Q2). Thus, if the temperature differences $\Delta Th1$ and $\Delta Th2$ between the gas and the temperatures of the heating resistors, the flow rate Q1 detected by the heating resistor Rh1, and the flow rate Q2 detected by the heating resistor Rh2 are known, it is possible to determine to what degree an error has arisen in the currently detected flow rate based on the relation shown in FIG. 34. The flow rate error can then be decreased by subtracting or adding the flow rate error from or to the detected flow rate. This describes the flow rate error correction principle of the present invention.

Figure 1:
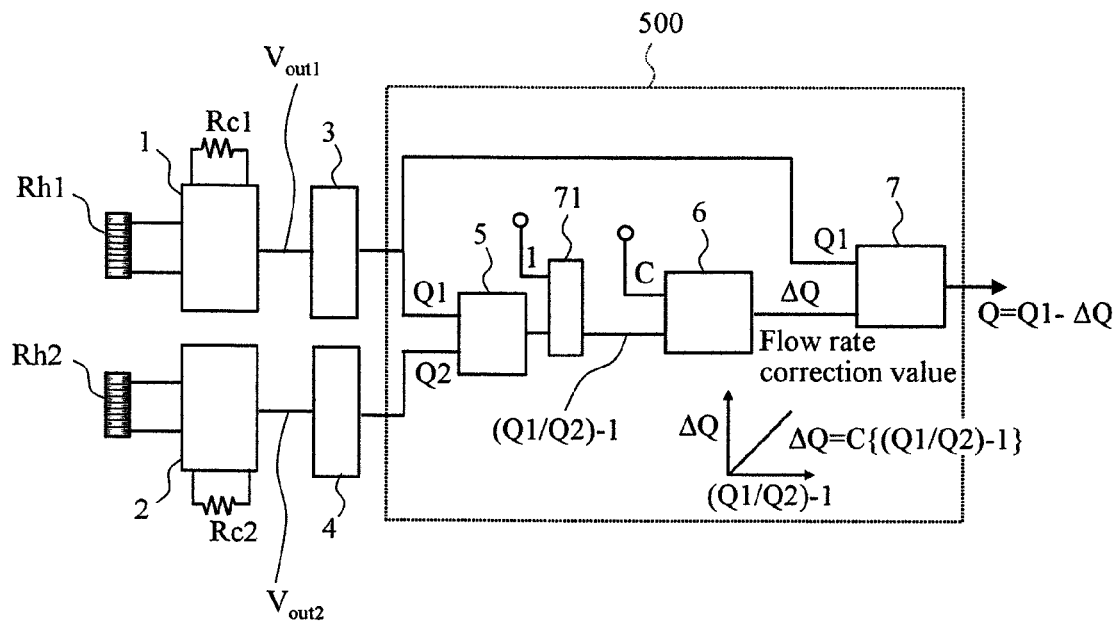
FIG. 1 is a configuration diagram that illustrates a first embodiment of a thermal flow meter of the present invention.

Next, the first embodiment of the present invention is described using FIG. 1.

Figure 29:
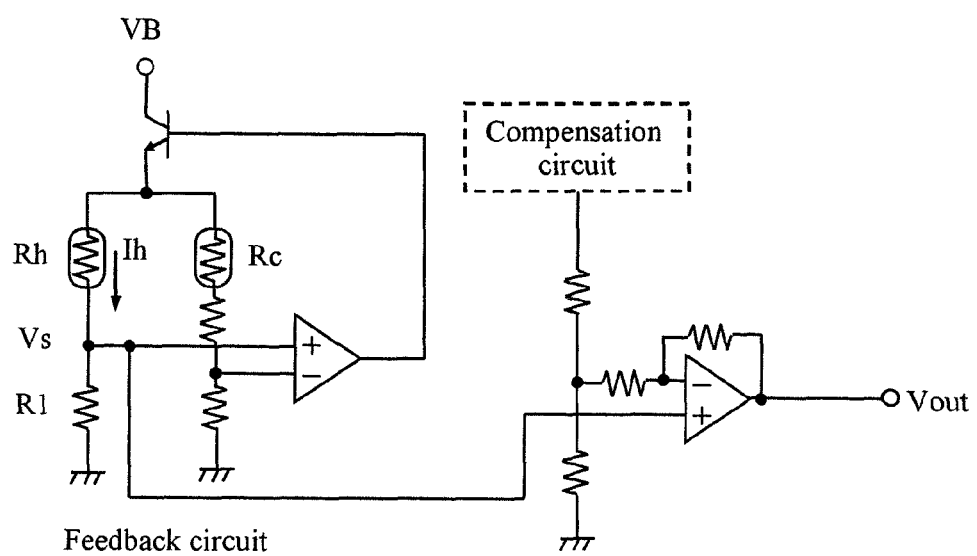
FIG. 29 is a configuration diagram of a bridge control circuit of the thermal flow meter shown in FIG. 28.
Figure 30:
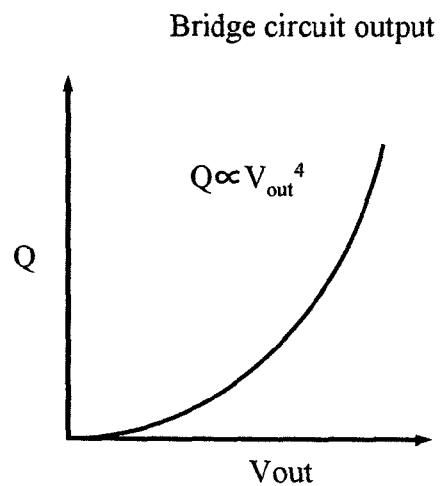
FIG. 30 is a graph that illustrates the relation between mass flow rate and sensor output voltage in a thermal flow meter.
Figure 31:
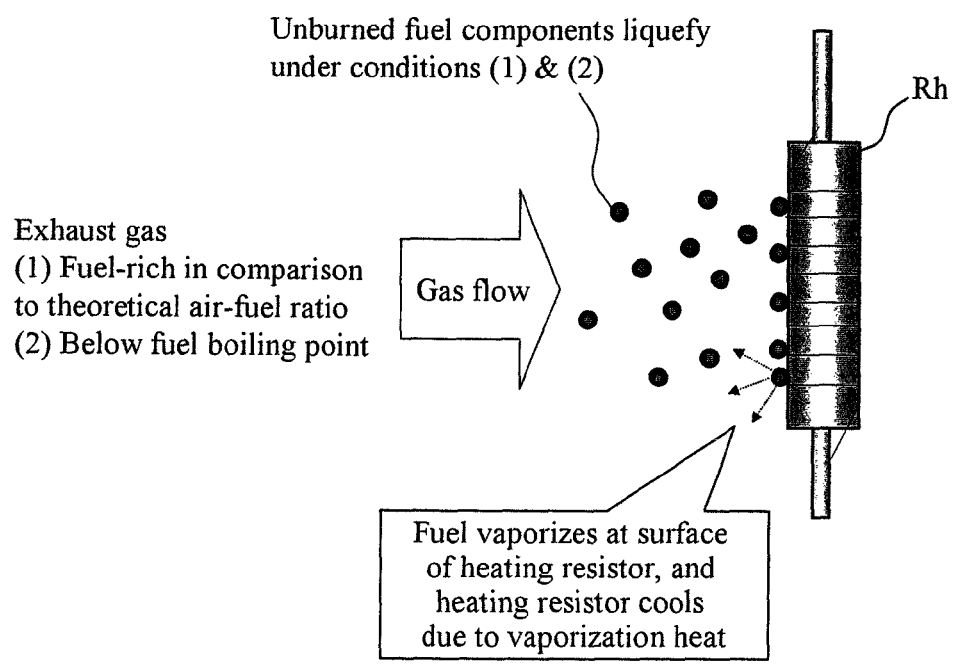
FIG. 31 is a view that illustrates factors that cause the occurrence of an error in a thermal flow meter.
Figure 32:
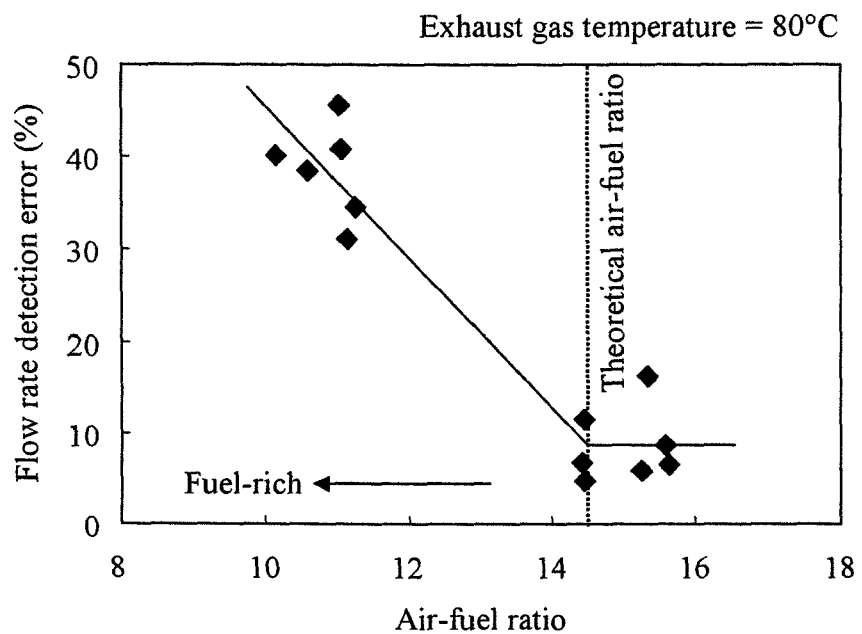
FIG. 32 is a graph illustrating experimental results that show flow rate detection errors with respect to air-fuel ratios, which are measurement results for the flow rate of exhaust air of an engine.

In FIG. 1, an output from a bridge circuit 1 comprising an unshown fixed resistor, a heating resistor Rh1, and a resistance temperature detector Rc1 and the like is connected to a linearizer 3. Further, an output from a bridge circuit 2 comprising an unshown fixed resistor, a heating resistor Rh2, and a resistance temperature detector Rc2 and the like is connected to a linearizer 4. The outputs of the two linearizers 3 and 4 are input to a flow rate correction circuit 500. As shown in FIG. 29, the bridge circuit 1 and bridge circuit 2 each comprise a heating resistor Rh, a resistance temperature detector Rc, a fixed resistor, a transistor TR and the like. A current flowing to the heating resistor Rh is adjusted using feedback so that a temperature of the resistance temperature detector Rh is higher by a constant temperature $\Delta T$ than the temperature of a gas to be measured. A resistance value or the like in the respective bridge circuits is set so that the relation $\Delta Th2 > \Delta Th1$ exists with respect to a temperature difference $\Delta Th1$ between a gas to be measured and the temperature of the heating resistor Rh1 and a temperature difference $\Delta Th2$ between a gas to be measured and the temperature of the heating resistor Rh2.

Figure 2:
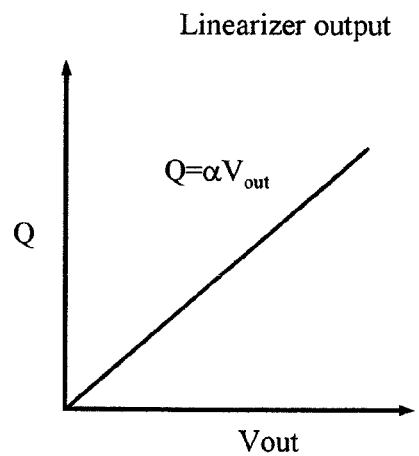
FIG. 2 is a graph that illustrates the relation between a linearizer and a flow rate in a first embodiment of the present invention.

As shown in FIG. 2, the linearizers 3 and 4 perform linearization with respect to a sensor output Vout that is output from a bridge circuit and a mass flow rate Q that is detected by a sensor, and output a voltage value that is proportional to the mass flow rate Q. More specifically, an output Q1 that is proportional to a flow rate that is detected by the heating resistor Rh1 is output from the linearizer 3. Similarly, an output Q2 that is proportional to a flow rate that is detected by the heating resistor Rh2 is output from the linearizer 4.

The flow rate correction circuit 500 comprises a divider 5, a multiplier 6, and subtracters 7 and 71. The output of the linearizer 3 and linearizer 4 is input to the divider 5, and a voltage value (Q1/Q2) that is proportional to a ratio between flow rates Q1 and Q2 that are detected at the heating resistors Rh1 and Rh2 is output. (Q1/Q2)−1 is determined by the subtracter 71, and this value is input to the multiplier 6. A value $C\{(Q1/Q2)-1\}$ that is the product of another input value C of the multiplier 6 and (Q1/Q2)−1 is output from the multiplier 6.

A substantially linear relation exists between the flow rate ratio Q1/Q2 and a flow rate error, as shown in FIG. 34. Accordingly, as shown in FIG. 3, the relation between the flow rate ratio (Q1/Q2)−1 and the flow rate correction value $\Delta Q$ is previously determined for each combination of temperature differences $\Delta Th1$ and $\Delta Th2$ between a gas and a temperature of a heating resistor, and a slope $d(\Delta Q)/d\{(Q1/Q2)-1\}$ of a graph that corresponds to the current $\Delta Th1$ and $\Delta Th2$ is set as C as the input of the multiplier 6.

A flow rate correction value $\Delta Q$ determined by the multiplier 6 is input to the subtracter 7. A difference between the flow rate correction value $\Delta Q$ and the flow rate value Q1 that is detected by the heating resistor Rh1 is output from the subtracter 7 as the detected flow rate value Q of the present thermal flow meter.

Figure 3:
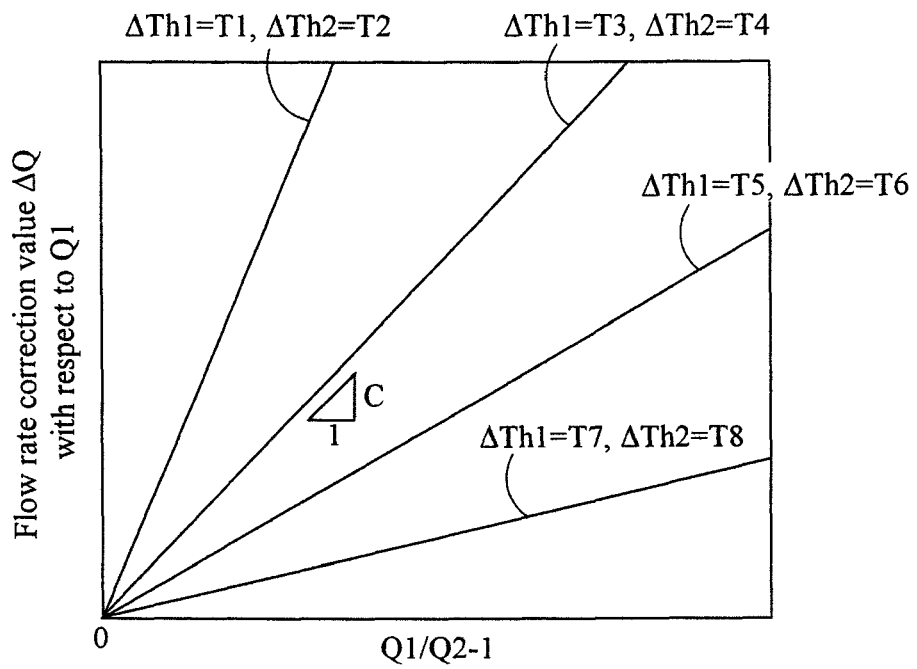
FIG. 3 is a graph that illustrates the relation between flow rate ratios and flow rate correction values of the thermal flow meter shown in FIG. 1.

According to the present embodiment, in a case in which liquid phase components included in a gas to be measured vaporize on the surface of a heating resistor, a flow rate variation $\Delta Q$ (flow rate error) that arises in Q1 due to a vaporized latent heat effect can be determined from the relationship between (Q1/Q2) and the correction amount $\Delta Q$ shown in FIG. 3. By subtracting $\Delta Q$ from Q1, the flow rate error produced in the calculated Q1 by the vaporized latent heat effect can be corrected. Alternatively, by adding $\Delta Q$ to Q2, a flow rate error occurring in the calculated Q2 can be corrected.

According to the above described embodiment, a flow rate correction value $\Delta Q$ is determined as an amount that is proportional to the ratio (Q1/Q2) between different flow rate values that are detected from two heating resistors. However, in a case in which there is not a completely linear relation between (Q1/Q2) and the flow rate error as shown in FIG. 34 and the flow rate correction value is large, there is a concern that an error will arise in the flow rate correction value.

Figure 4:
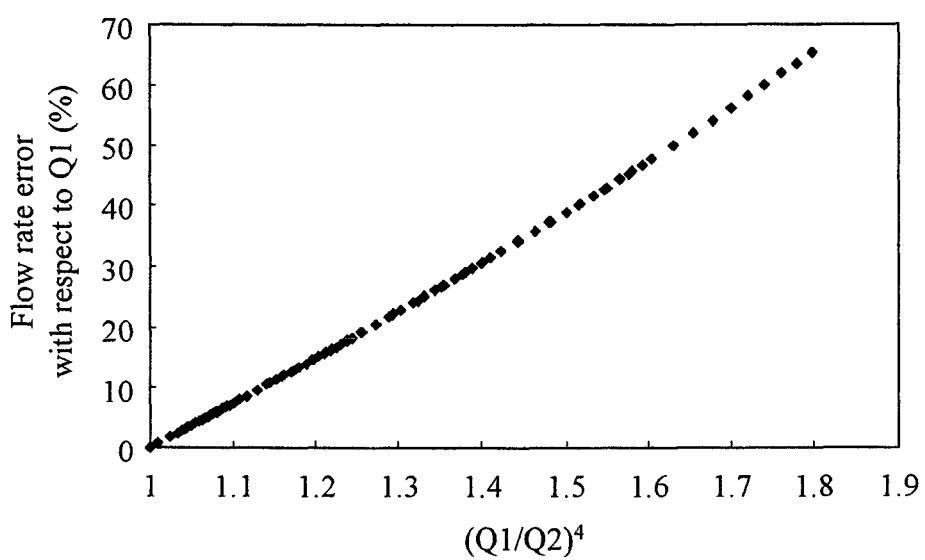
FIG. 4 is a graph that illustrates the relation between fourth-power values of a flow rate ratio and flow rate correction values of the thermal flow meter shown in FIG. 1.

FIG. 4 is a view that illustrates an example showing the relation between a flow rate detection error and a fourth-power value of the ratio (Q1/Q2) between flow rate values that are detected from two heating resistors. FIG. 4 shows that a relationship with a higher degree of linearity exists between a fourth-power value of (Q1/Q2) and a flow rate detection error in comparison with the relationship between (Q1/Q2) and a flow rate detection error shown in FIG. 34. As shown in equation (2), this is because a flow rate that is detected with a thermal flow meter is in a relation with the fourth-power root of the sensor output voltage. Hence, by using the relation shown in FIG. 4, it is possible to correct a flow rate more accurately even when the flow rate correction width is large.

Figure 5:
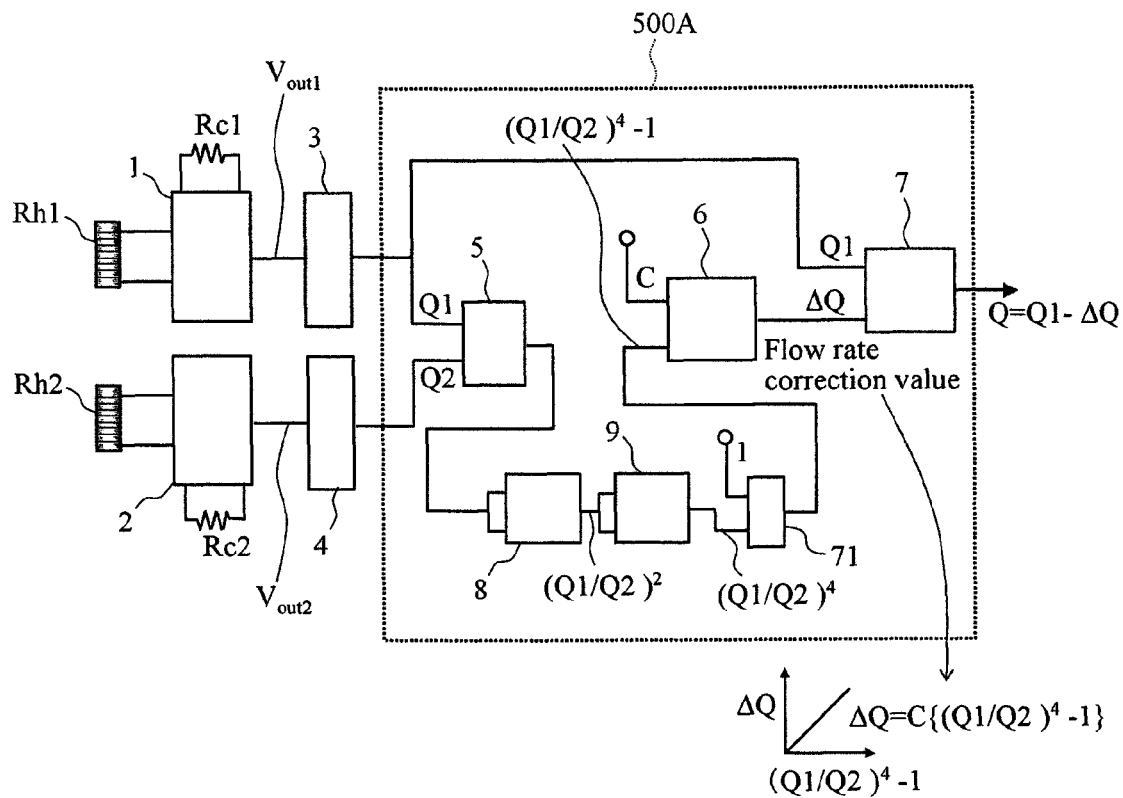
FIG. 5 is a configuration diagram that illustrates a second embodiment of the thermal flow meter of the present invention.

A second embodiment of the present invention that realizes this is shown in FIG. 5. The present embodiment differs from the first embodiment of the present invention shown in FIG. 1 in the respect that a correction circuit 500A is provided in which multipliers 8 and 9 are inserted in series between the divider 5 and multiplier 6 inside the correction circuit 500 of the first embodiment. The remaining configuration is the same as the first embodiment shown in FIG. 1. According to the second embodiment of the present invention, a ratio (Q1/Q2) between flow rates detected by two heating resistors is obtained by the divider 5. By input of (Q1/Q2) to the two multipliers 8 and 9 that are connected in series, a fourth-power value $(Q1/Q2)^4$ of the flow rate ratio is obtained, and a value $(Q1/Q2)^4 - 1$ is obtained by the subtracter 71. This value is input to the multiplier 6. A product $C(Q1/Q2)$ of (Q1/Q2) and another input value C of the multiplier 6 is output from the multiplier 6.

As shown in FIG. 4, there is a substantially linear relation between a fourth-power value $(Q1/Q2)^4$ of the flow rate ratio and the flow rate error. Accordingly, as shown in FIG. 6, the relation between a fourth-power value $(Q1/Q2)^4 - 1$ of the flow rate ratio and the flow rate correction value $\Delta Q$ is previously determined for each combination of temperature differences $\Delta Th1$ and $\Delta Th2$ between a gas and a temperature of a heating resistor, and a slope $d(\Delta Q)/d\{(Q1/Q2)^4 - 1\}$ of a graph that corresponds to the current $\Delta Th1$ and $\Delta Th2$ is set as C as the input of the multiplier 6.

A flow rate correction value $\Delta Q$ determined by the multiplier 6 is input to the subtracter 7. A difference between the flow rate correction value $\Delta Q$ and the flow rate value Q1 that is detected by the heating resistor Rh1 is output from the subtracter 7 as the detected flow rate value Q of the thermal flow meter.

Figure 6:
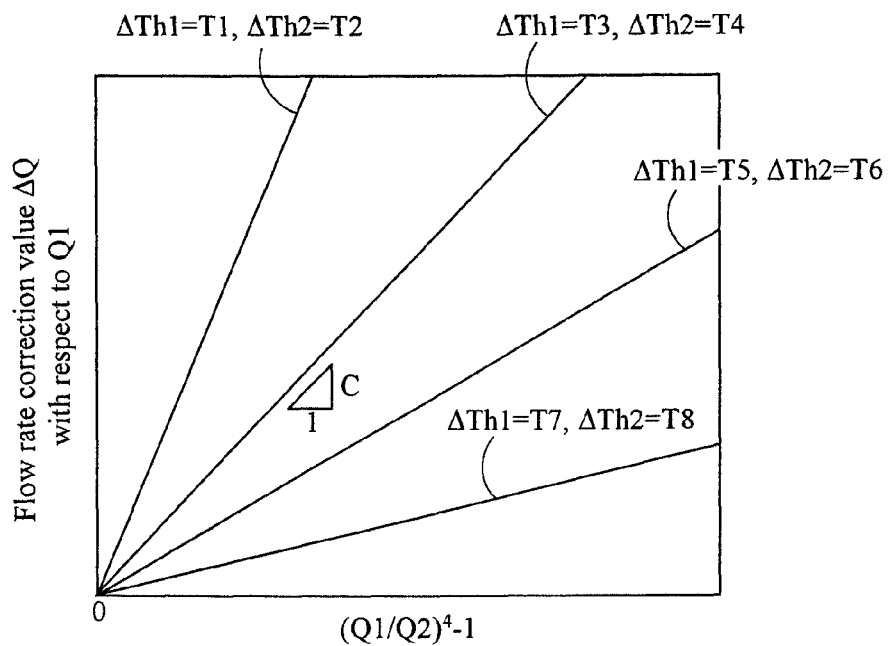
FIG. 6 is a graph that illustrates the relation between fourth-power values of a flow rate ratio and flow rate correction values.

According to the present embodiment, in a case in which liquid phase components included in a gas to be measured vaporize on the surface of a heating resistor, a flow rate variation $\Delta Q$ (flow rate error) that arises in Q1 due to a vaporized latent heat effect can be determined from the relationship between a fourth-power value of (Q1/Q2) and the correction amount $\Delta Q$ as shown in FIG. 6. By subtracting $\Delta Q$ from Q1, the flow rate error produced in Q1 by the vaporized latent heat effect can be corrected. Since the relation between a fourth-power value of (Q1/Q2) and the flow rate detection error is closer to a linear relation in comparison to the relation between (Q1/Q2) and the flow rate detection error, even when the flow rate correction amount is large it is possible to perform flow rate correction more accurately in comparison with the first embodiment of the present invention.

Although a flow rate correction method using an analog circuit was described according to both the above described first embodiment and second embodiment, correction may be performed using a microcomputer instead of an analog circuit.

Figure 7:
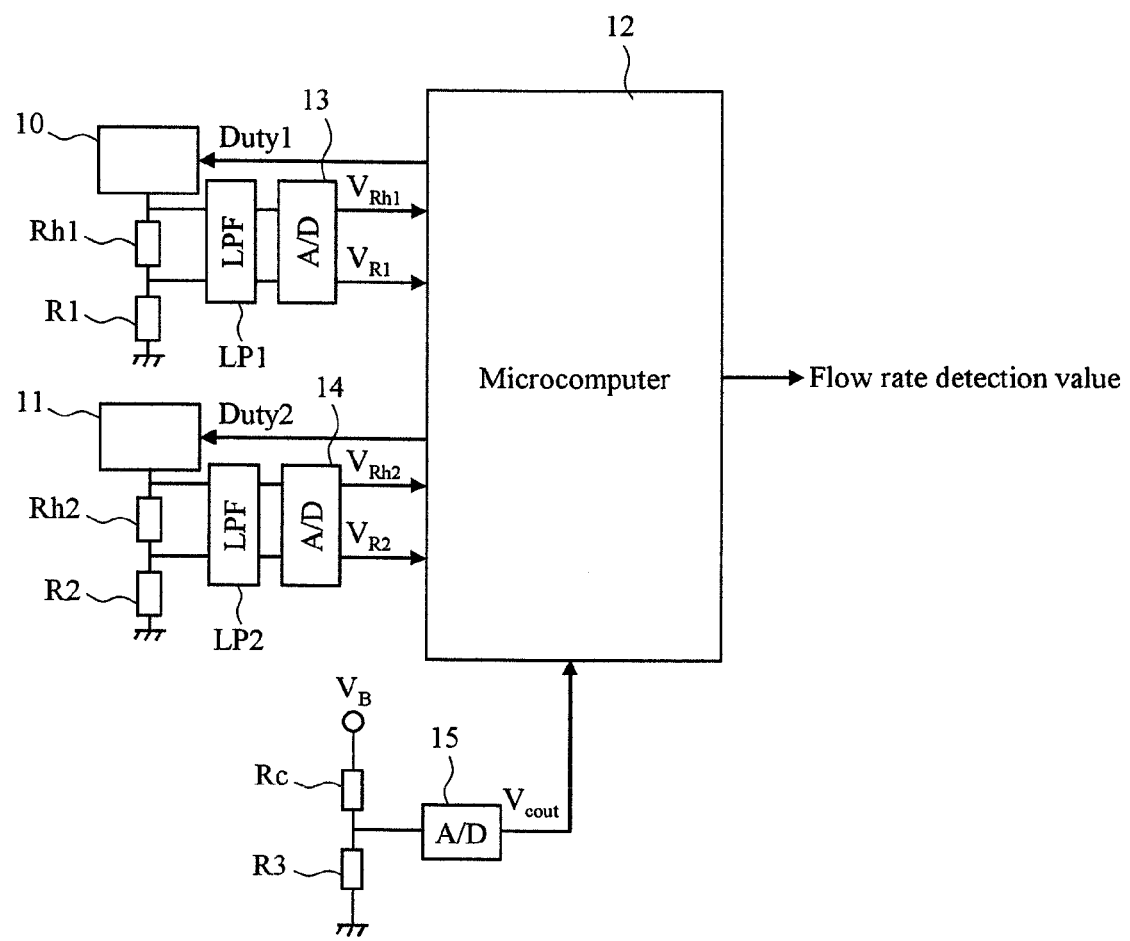
FIG. 7 is a configuration diagram that illustrates a third embodiment of the thermal flow meter of the present invention.

FIG. 7 is a view that illustrates an embodiment that performs flow rate correction using a microcomputer as a third embodiment of the present invention.

According to the present embodiment, a voltage is applied by a heater driving circuit 10 to the heating resistor Rh1. The heater driving circuit 10 changes a voltage value that is applied to the heating resistor Rh1 according to an instruction from a microcomputer 12.

The heating resistor Rh1 and a fixed resistor R1 are serially connected. After an analog voltage value $V_{Rh1}$ between the heater driving circuit 10 and the heating resistor Rh1 and an analog voltage value $V_{R1}$ between Rh1 and R1 respectively pass through a low-pass filter LP1, the values $V_{Rh1}$ and $V_{R1}$ are input to an A/D converter 13. The values $V_{Rh1}$ and $V_{R1}$ are converted to digital values by the A/D converter 13 and input to the microcomputer 12, respectively.

A voltage is applied by a heater driving circuit 11 to the heating resistor Rh2. The heater driving circuit 11 changes a voltage value that is applied to the heating resistor Rh2 according to an instruction from the microcomputer 12.

The heating resistor Rh2 and a fixed resistor R2 are serially connected. After an analog voltage value $V_{Rh2}$ between the heater driving circuit 11 and the heating resistor Rh2 and an analog voltage value $V_{R2}$ between Rh2 and R2 respectively pass through a low-pass filter LP2, the values $V_{Rh2}$ and $V_{R2}$ are input to an A/D converter 14. The values $V_{Rh2}$ and $V_{R2}$ are converted to digital values by the A/D converter 14 and input to the microcomputer 12, respectively.

Further, a resistance temperature detector Rc and a fixed resistor R3 are serially connected. After an analog voltage value between Rc and R3 is converted to a digital value $V_{cout}$ by an A/D converter 15, the value $V_{cout}$ is input to the microcomputer 12. A constant voltage is applied to the resistance temperature detector Rc from a power source VB. In this case, a resistance value for the fixed resistor R3 and the resistance temperature detector Rc and a voltage value VB that is applied to the resistance temperature detector are set so that a current value flowing through the resistance temperature detector Rc is an extremely small value. Because the current flowing to the resistance temperature detector Rc is extremely small, a Joule heating amount produced by the resistance temperature detector Rc is small, and the temperature of the resistance temperature detector Rc substantially matches the temperature of the gas to be measured.

An example of the operations of the heater driving circuits 10 and 11 will be described using FIG. 8 and FIG. 9.

Figure 8:
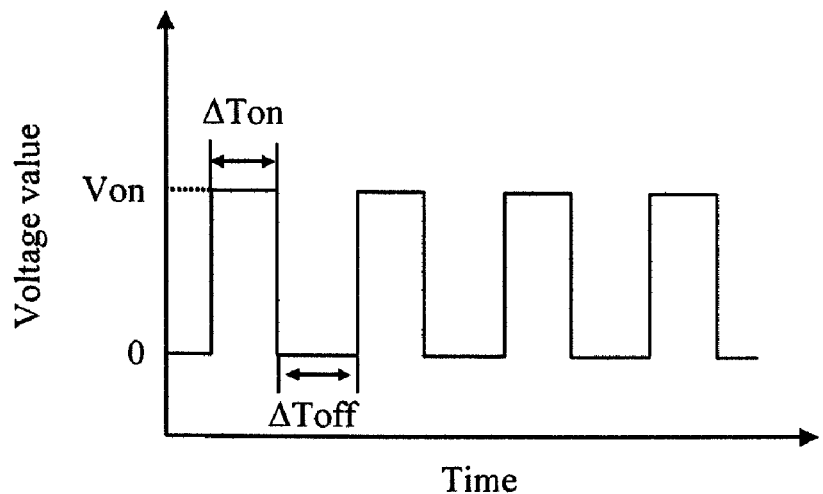
FIG. 8 is a diagram of a voltage waveform that is applied to a heater driving circuit.
Figure 9:
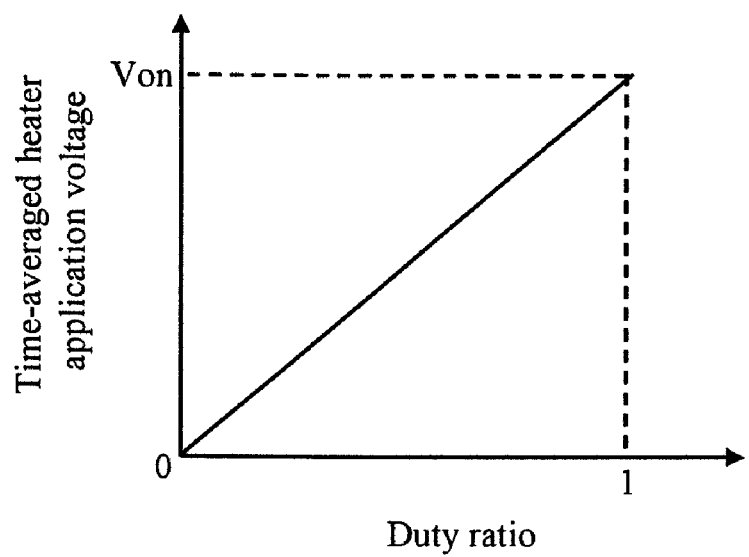
FIG. 9 is a graph that illustrates the relation between a duty ratio and an applied voltage.

FIG. 8 illustrates an example of a voltage waveform that is applied to a heating resistor from a heater driving circuit. The voltage waveform that is output from the heater driving circuit to the heating resistor is a rectangular wave as shown in FIG. 8, and the voltage value is zero or takes a binary value of Von. In this case, in one rectangular wave, a period where the voltage is zero is referred to as ΔToff, and a period in which the voltage is Von is referred to as ΔTon. It is assumed that ΔToff+ΔTon is always constant. More specifically, it is assumed that the frequency of the rectangular pulse is always constant. Here, the duty ratio is defined by equation (3).

$$\text{Duty ratio} = \Delta Ton/(\Delta Ton + \Delta Toff) \quad (3)$$

More specifically, the duty ratio shows the proportion of time of Von in one pulse cycle period. The duty ratio is arbitrarily set between 0 and 1 by an instruction from the microcomputer. FIG. 9 is a view that illustrates an example of the relation of a time mean value of a voltage that is applied to a heating resistor from a heater driving circuit with respect to the duty ratio. In this case, the term "time mean value of a voltage" refers to, for example, a mean value of a voltage for 100 rectangular pulses, or, for example, a voltage mean value during one second. An interval for taking a time mean can be suitably determined based on various factors and requirements such as a response speed or circuit time constant required of a flow meter or the operating frequency of a microcomputer. As shown in FIG. 9, the duty ratio and mean voltage are in a proportional relationship. That is, by the microcomputer suitably changing the duty ratio that is instructed to the heater driving circuit within the range of 0 to 1, it is possible to arbitrarily change an applied voltage value for a time mean to the heating resistor within a range from 0 to Von.

Figure 10:
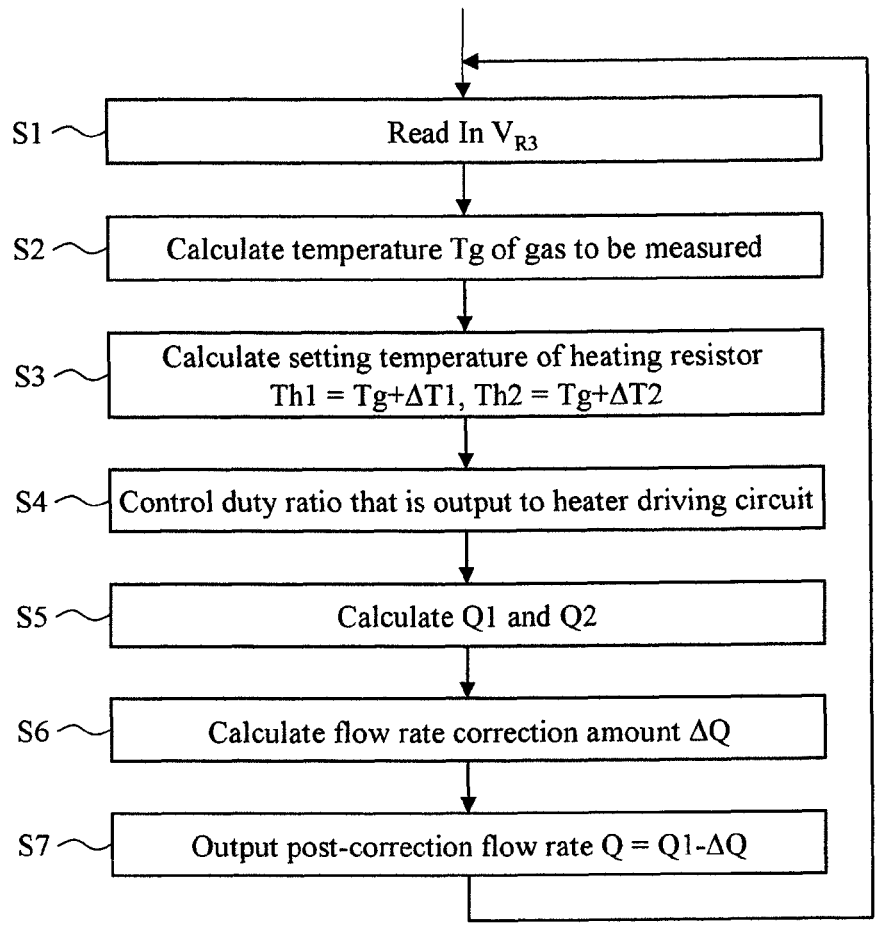
FIG. 10 is a flowchart that illustrates a processing flow of a microcomputer according to the third embodiment of the present invention.

FIG. 10 is a flowchart that shows the procedures for correcting the flow rate that are carried out by the microcomputer. At step S1, a voltage value $V_{R3}$ between the resistance temperature detector Rc and the fixed resistor R3 is read. At step S2, a temperature Tg of a gas to be measured is calculated based on $V_{R3}$.

Figure 11:
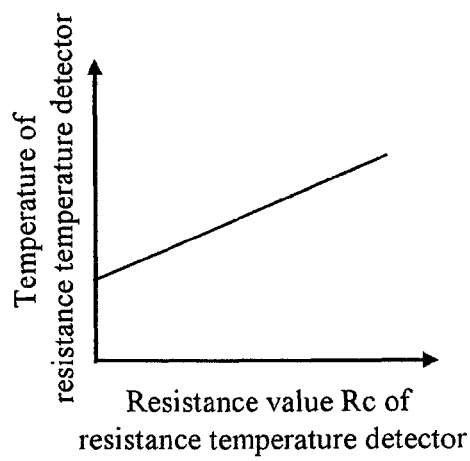
FIG. 11 is a graph that illustrates the relation between temperature and a resistance value of a resistance temperature detector.

The method of calculating the temperature Tg of the gas to be measured inside the microcomputer is described using FIG. 11 and equation (4). As shown in FIG. 11, a substantially linear relation exists between the temperature of the resistance temperature detector Rc and the resistance value of the resistance temperature detector Rc. As described above, since the current flowing to the resistance temperature detector Rc is extremely small, the Joule heating amount of the resistance temperature detector Rc itself is small and the temperature of the resistance temperature detector Rc substantially matches the temperature Tg of the gas to be measured. Therefore, if the resistance value of the resistance temperature detector Rc can be known from the relation show in FIG. 11, the temperature Tg of the gas to be measured can be determined. The resistance value of the resistance temperature detector Rc is calculated by equation (4) using Ohm's law.

$$Rc = (V_B - V_{R3})R3/V_B \quad (4)$$

That is, the microcomputer determines the resistance value of the resistance temperature detector Rc using equation (4) based on the voltage value $V_{R3}$ of the fixed resistor R3, and the temperature Tg of the gas to be measured can be determined based on Rc and the relation shown in FIG. 11.

At step S3 in FIG. 10, the setting temperatures Th1 and Th2 of the heating resistors Rh1 and Rh2 are respectively determined by equation (5) and equation (6).

$$Th1 = Tg + \Delta T1 \quad (5)$$

$$Th2 = Tg + \Delta T2 \quad (6)$$

In this case, ΔT1 and ΔT2 represent the setting temperature differences of the heating resistors with respect to the temperature Tg of the gas to be measured, and the temperatures are previously set so that ΔT1<ΔT2. Further, it is desirable to set the temperature so that ΔT1 is 100° C. or greater. This is because, if the difference between the heating resistor temperature and the temperature of the gas to be measured is small, the amount of heat transmitted to the gas decreases and the flow rate detection accuracy decreases due to a deterioration in the S/N ratio. Further, when a polluting substance such as carbon or oil is included in a gas to be measured, such as exhaust gas of an engine, it is desirable to set the temperature of the heating resistor so that ΔT1 is 600° C. or more. This is because when the heating resistor temperature is high it is possible to vaporize oil or the like that adheres to the heating resistor in a short time, and thereby prevent polluting substances accumulating on the surface of the heating resistor.

Next, at step S4, the duty ratios duty 1 and duty 2 that are output to a driving circuit of the heating resistor are respectively controlled so that the temperatures of the heating resistors Rh1 and Rh2 become the setting temperatures Th1 and Th2 that are determined at step S3.

Figure 12:
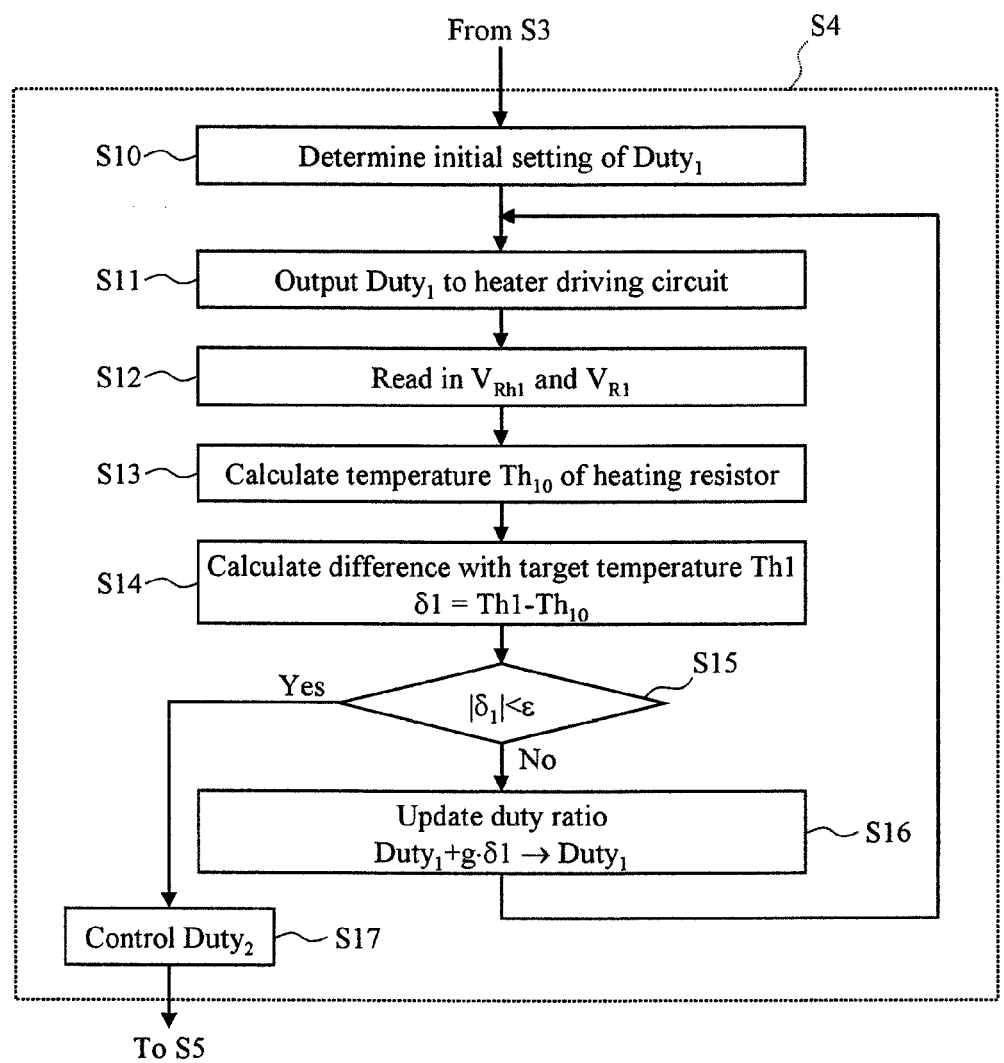
FIG. 12 is a flowchart that illustrates a processing flow of a microcomputer with respect to a heater driving circuit.
Figure 13:
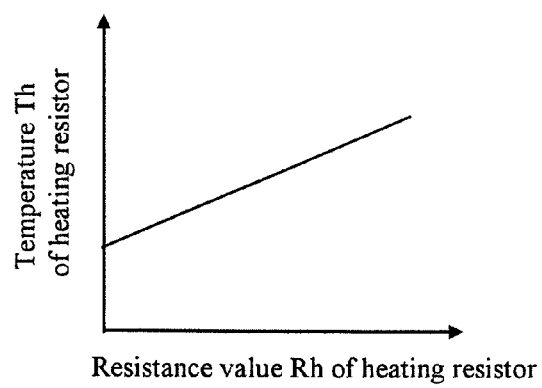
FIG. 13 is a graph that illustrates the relation between temperature and a resistance value of a heating resistor.

FIG. 12 is a view that illustrates one example of a detailed flow of the procedures at step S4. At step S10, an initial value is determined for the duty ratio duty 1 that is output to the heater driving circuit 1. At step S11, duty 1 is output to the heater driving circuit 1. At the heater driving circuit 1, a voltage based on a duty ratio that is input as illustrated in FIG. 9 is applied to the heating resistor 1. Next, at step S12, time mean values VRh1 and VR1 of the voltages at both ends of the heating resistor Rh1 are read into the microcomputer. At step S13, the current temperature Th10 of the heating resistor Rh1 is determined. The principles for calculating the temperature of the heating resistor are the same as the above described principles for calculating the temperature of the resistance temperature detector. More specifically, since there is a linear relation between the temperature and resistance value of the heating resistor as shown in FIG. 13, if the resistance value of the heating resistor Rh1 is known, the temperature Th10 of the heating resistor Rh1 can be determined based on the relation shown in FIG. 13. The resistance value of the heating resistor Rh1 can be calculated using VRh1 and VR1 using equation (7) that is derived from Ohm's law.

$$Rh1 = (VRh1 - VR1)R1/VRh1 \quad (7)$$

At step S14, a difference 61 between the target setting temperature Th1 and the current heating resistor temperature Th10 is determined. At step S15, the absolute value of δ1 is compared with a preset threshold value ε (a minute value for testing for convergence). When the absolute value of δ1 is greater than the threshold value ε, at step S16 the current duty value, duty 1, is updated by proportional control (P control). Here, G represents a preset proportional control gain.

Duty 1+G·δ1→duty 1

After updating duty 1, the operation returns to step S11. Thereafter, the operations from step S11 to step S16 are repeated until the temperature of the heating resistor Rh1 converges with the setting temperature Th1.

In this connection, although according to the present embodiment proportional control (P control) was used to update the duty ratio at step S16, it is possible to make the temperature of the heating resistor Rh1 accurately converge with the setting temperature in a short time by using proportional-integral control (PI control) or proportional-integral-derivative control (PID control) or the like.

At step S15, when it is judged that the absolute value of δ1 is smaller than the threshold value ε, it is assumed that the temperature of the heating resistor Rh1 converged with the setting temperature Th1, and the operation then moves to control of duty 2 at step S17. Control of duty 2 is performed by the same method as control of duty 1 that is shown in step S10 to step S16 to set duty 2 so that the temperature of the heating resistor Rh2 becomes the setting temperature Th2.

As described above, when the heating resistor is set to a predetermined temperature by control of duty 1 and duty 2, next, at step S5 in FIG. 10, a flow rate detection value Q1 and a flow rate detection value Q2 are determined by the heating resistor Rh1 and the heating resistor Rh2, respectively. The relation shown in equation (8) exists between the flow rate Q1 that is detected with the heating resistor 1 and the detected voltage value VR1 of the heating resistor 1, the heating resistor temperature Th1, and the gas temperature Tg.

$$Q_1 = \alpha_1 V_{R1}^4 / (T_{Rh1} - T_g)^2 \quad (8)$$

Here, α1 is a coefficient that is decided depending on the structure or physical property values or the like of the heating resistor. Similarly, the relation shown in equation (9) exists between the flow rate Q2 that is detected with the heating resistor Rh2 and the detected voltage value VR2 of the heating resistor Rh2, the heating resistor temperature Th2 and the gas temperature Tg.

$$Q2 = \alpha_2 V_{R2}^4 / (T_{Rh2} - Tg)^2 \quad (9)$$

In this connection, since physical property values of a gas vary according to temperature, α1 and α2 are generally functions of temperature. In a case where the range of variation in the temperature of the gas to be measured is relatively small, α1 and α2 may be set as constants. Further, when the range of variation in the temperature of the gas to be measured is wide, it is possible to perform flow rate detection with higher accuracy by previously providing the temperature variation characteristics of α1 and α2 to a function or table.

Next, at step S6 in FIG. 10, a correction value ΔQ for the flow rate is obtained. As one example of the method of obtaining the flow rate correction value ΔQ, as shown in FIG. 4, since there is a substantially linear relation between a fourth-power value of the flow rate ratio (Q1/Q2) and the flow rate error, the flow rate correction value ΔQ can be obtained by the approximation function shown in equation (10).

$$\Delta Q = K\{(Q1/Q2)^4 - 1\} \quad (10)$$

Here, K is a coefficient, and represents a function of the heating resistor temperatures Th1 and Th2.

$$K = K(Th1, Th2) \quad (11)$$

Figure 14:
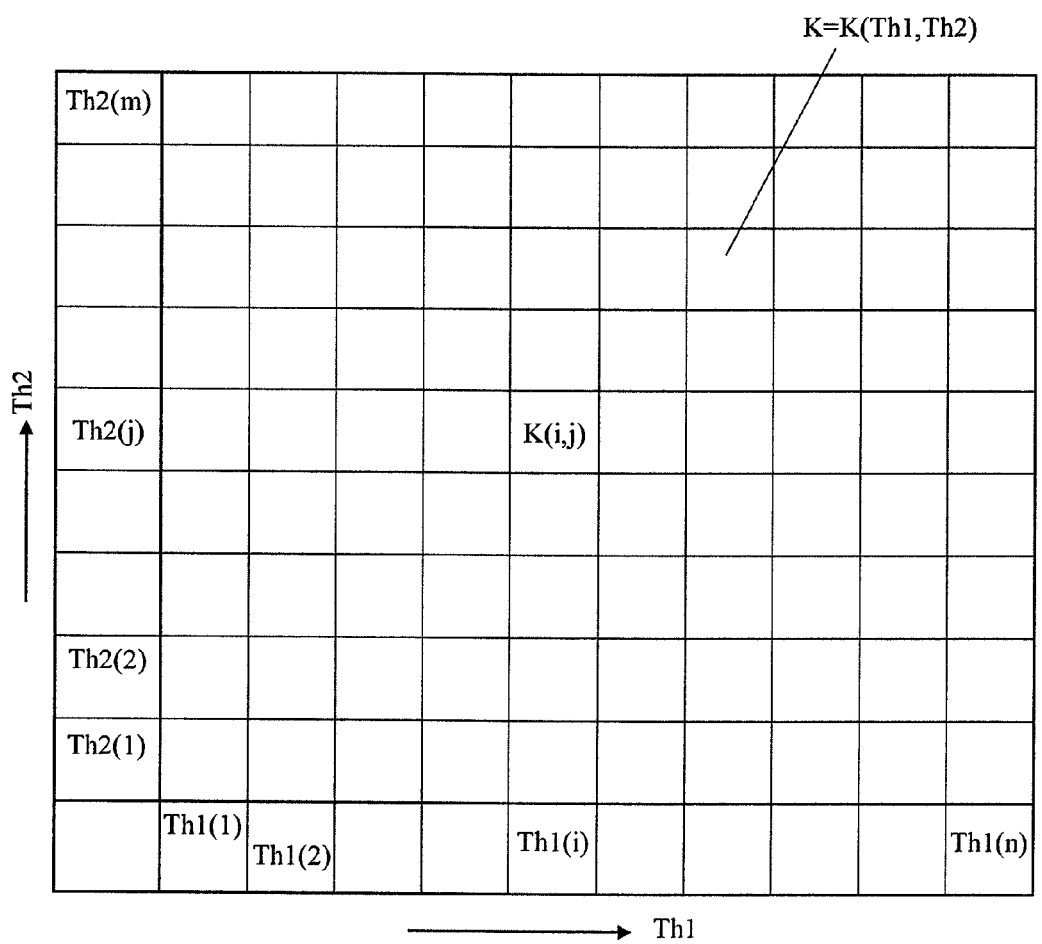
FIG. 14 is a view that illustrates an example of a correction map of a coefficient K in equation (10).

Regarding K, by previously performing various verification tests, the heating resistor temperature Th1 as shown in FIG. 14 is stored in the microcomputer as two-dimensional map data of Th2, and by supplying Th1 and Th2 the value of the coefficient K can be easily obtained based on the map.

At step S7 in FIG. 10, the post-correction flow rate value Q is obtained by subtracting the flow rate correction value ΔQ obtained with equation (10) from the flow rate detection value Q1 of the heating resistor Rh1, and this post-correction flow rate value Q is output as the detected flow rate value from the microcomputer.

According to the present embodiment, in a case in which liquid phase components included in a gas to be measured vaporized on the surface of a heating resistor, a flow rate variation ΔQ (flow rate error) produced in the flow rate value Q1 by the vaporized latent heat effect is determined based on the relation between a fourth-power value of (Q1/Q2) shown in FIG. 6 and the correction amount ΔQ. By subtracting ΔQ from Q1, the flow rate error produced in Q1 by the vaporized latent heat effect can be corrected. Since the flow rate detection and correction are performed with a microcomputer, the setting temperature of a heating resistor can be flexibly changed by the microcomputer.

In a case where a gas temperature changes from a relatively low temperature (for example, room temperature) to a high temperature (for example, 500° C. or more), such as in the case of engine exhaust gas, it is better to cause the temperature difference ΔT between the temperature of the heating resistor and the gas to change according to the gas temperature. More specifically, to raise the S/N ratio of gas flow rate detection, it is better that the temperature difference between the gas temperature and heating resistor is large to some degree (for example, ΔT=200° C.). In contrast, in a case where a gas temperature is a high temperature, if ΔT is large, the temperature of the heating resistor itself becomes an extremely high temperature and there is a risk of the temperature exceeding the heat resistance limit. Therefore, when a gas temperature is high, heat damage to a sensor can be prevented by making ΔT small.

Further, for example, in a case of an operating state in which a large amount of a polluting substance such as oil or carbon is included in the exhaust gas of an engine, a variety of temperature controls can be carried out using a microcomputer, such as preventing pollution by temporarily making the heating resistor temperature a high temperature, or burning a polluting substance such as carbon that adheres to the heating resistor. Furthermore, when a microcomputer is used it is possible to further improve the accuracy of calculation of a correction flow rate by making the flow rate correction function represented by equation (10) a polynomial of (Q1/Q2), or taking into account temperature dependence of physical property values for the coefficient K in equation (10).

Although in the above described embodiment a case is described in which a flow rate error is corrected using two heating resistors, it is also possible to perform flow rate correction using a single heating resistor.

Figure 15:
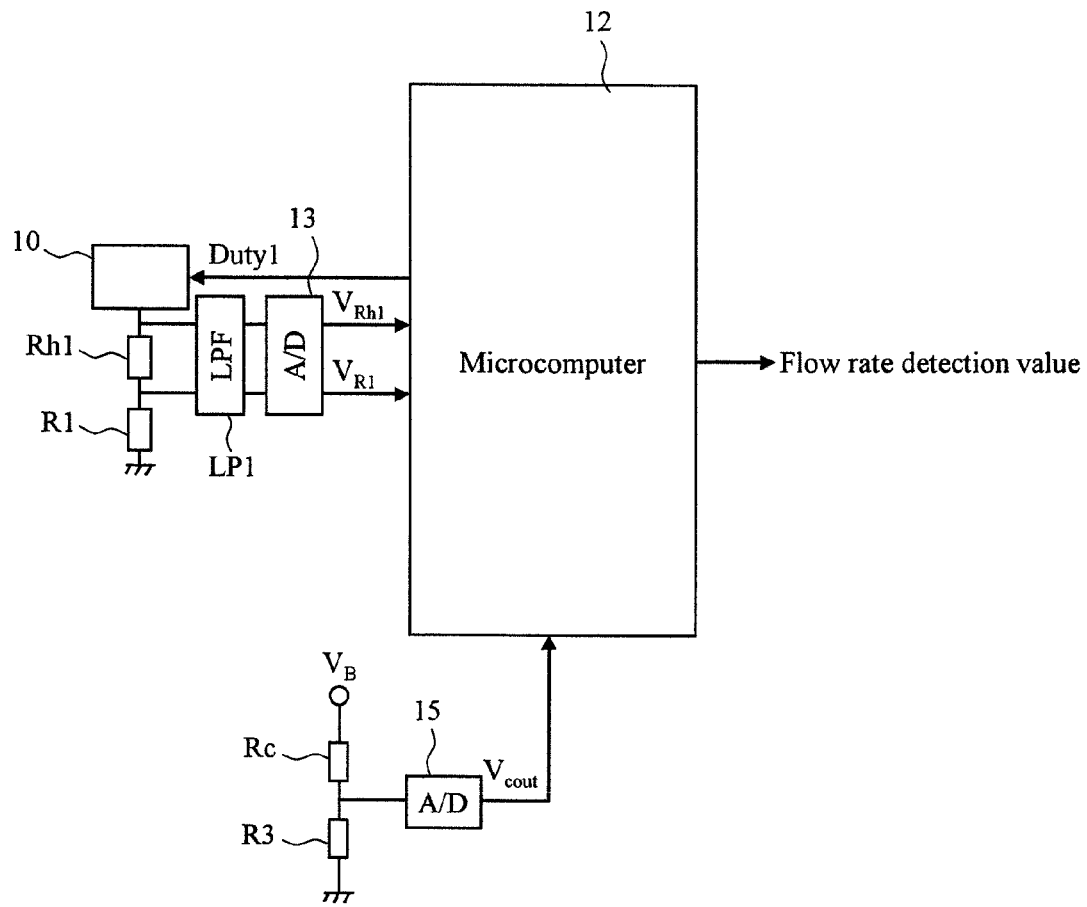
FIG. 15 is a configuration diagram that illustrates a fourth embodiment of a thermal flow meter of the present invention.

FIG. 15 is a view that illustrates a fourth embodiment of the present invention that shows a configuration example with a single heating resistor Rh1.

Figure 16:
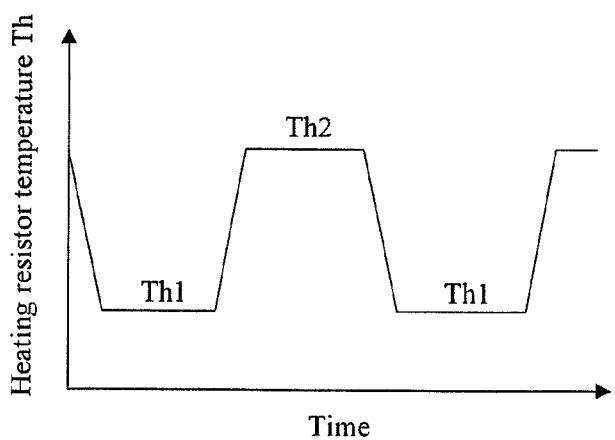
FIG. 16 is a graph that illustrates temperature changes of a heating resistor in the thermal flow meter shown in FIG. 15.

In the present embodiment, the temperature of the heating resistor Rh1 is changed as shown in FIG. 16. More specifically, the temperature of Rh1 is alternately switched between the two states of a low temperature Th1 and a high temperature Th2. By changing the temperature of the heating resistor in a temporal manner in this way and detecting flow rate values Q1 and Q2 in the respective temperature setting states, flow rate correction can be performed using Q1 and Q2 similarly to a case using two heating resistors.

Figure 17:
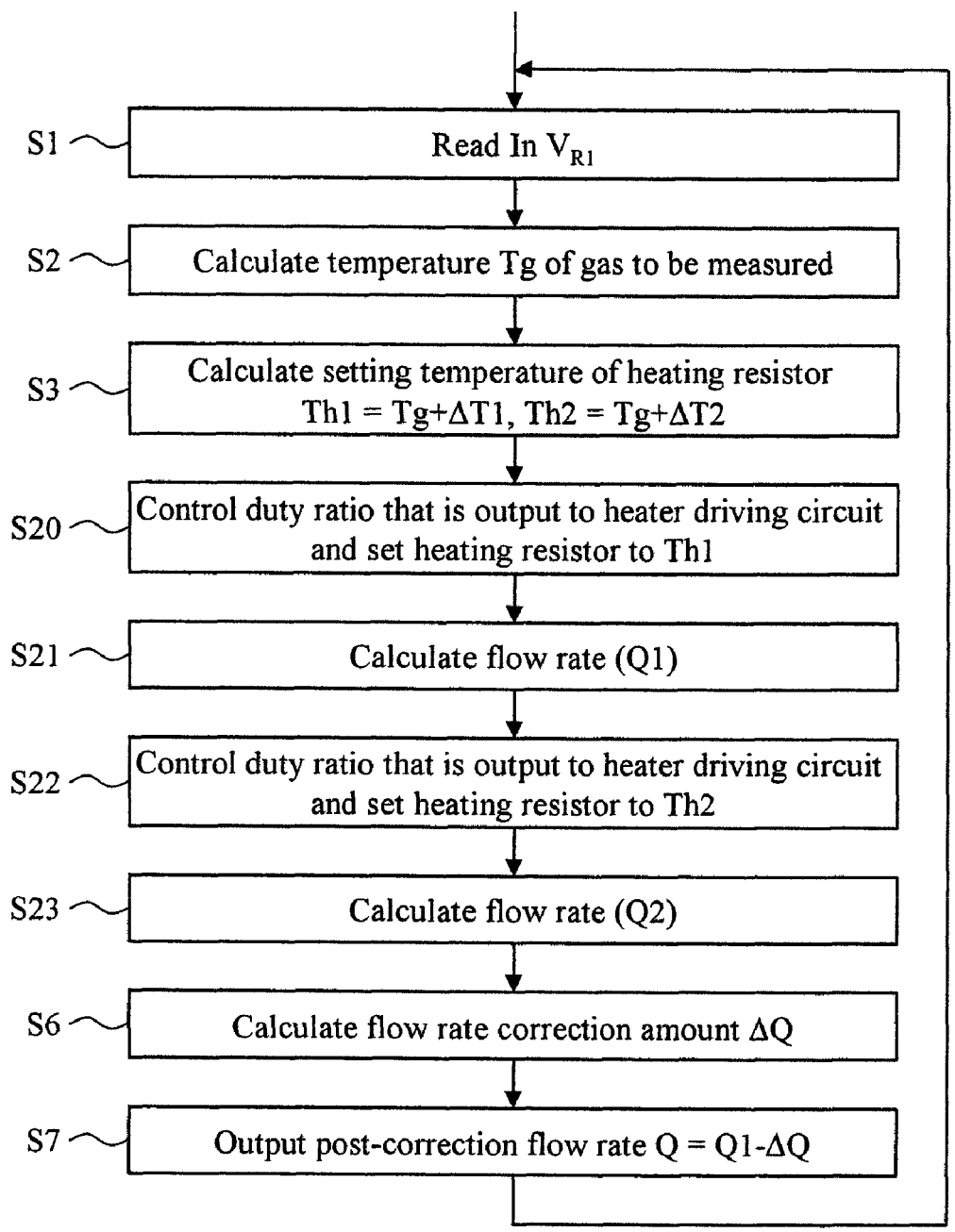
FIG. 17 is a flowchart that illustrates a processing flow of a microcomputer in the thermal flow meter shown in FIG. 15.

The processing flow according to the present embodiment is shown in FIG. 17. The gas temperature Tg is determined based on step S1 and step S2, and the setting temperatures Th1 and Th2 of the heating resistor Rh1 are determined at step S3. Here, ΔT1<ΔT2 and it is desirable that ΔT1 is made approximately 100 to 200° C. At step S20, by controlling the duty ratio that is output to the heater driving circuit, the heating resistor temperature is set to Th1. At step S21, the flow rate detection value Q1 in the setting temperature Th1 state is obtained. At step S22, by controlling the duty ratio that is output to the heater driving circuit, the heating resistor temperature is set to Th2. At step S23, the flow rate detection value Q2 in the setting temperature Th2 state is obtained. At step S6, a correction flow rate ΔQ is determined based on Q1 and Q2. The method of determining the correcting flow rate is the same as the above described case using two heating resistors. Subsequently, at step S7, a post-correction flow rate value Q is determined by subtracting ΔQ from Q1.

In a case where the flow is in a steady state, or when changes over time in the flow rate are relatively slow, there is little influence on the flow rate detection accuracy even when the flow rate values Q1 and Q2 are detected by staggering the time, using a single heating resistor as in the present embodiment. Further, according to the present embodiment, in comparison with a case using two heating resistors, the configuration of the sensor is simplified and the manufacturing cost can be reduced by using a single heating resistor. There is also the advantage that the size of the sensor element is reduced and the installation space can be made smaller.

FIG. 18 to FIG. 20 illustrate one example of the configuration of a sensor element in a case using two heating resistors. FIGS. 18 and 19 are views that illustrate examples of a sensor element configuration that is based on a coil-type element that is used in a flow meter for measuring the intake air of an engine. A first heating resistor Rh1, a resistance temperature detector Rs, and a second heating resistor Rh2 are arranged in that order from the end of a sensor element 30. A conducting wire is wound a plurality of times around an aluminum pipe 20, and a surface layer thereof is coated with a glass 21 that insulates and protects an electric conductor.

A favorable example of the shape of the aluminum pipe 20 is shown in FIG. 19. A plurality of grooves 22 for disposing support elements 23, 23 . . . are formed on the outer circumference of the aluminum pipe 20. FIG. 19 illustrates a case in which six grooves are formed, and this represents a structure in which two grooves are utilized for a single resistor. After inserting a support element 23 from a side face into each groove 22, electric conductors to serve as the respective resistors are wound around the aluminum pipe 20. Accordingly, it is necessary to make a depth X of the support element insertion groove sufficiently larger than the external shape of the support element. The two ends of the first heating resistor Rh1, the two ends of the resistance temperature detector Rs, and the two end of the second heating resistor Rh2 that comprise a coil are connectedly fixed by welding at connection points 25, 25 . . . between each resistor and the support elements 23, 23 . . . . Further, regarding the manner of arranging the resistance temperature detector, although a configuration in which the first heating resistor Rh1 and the resistance temperature detector Rs are adjacently disposed and formed into one block with the glass 21 is considered advantageous in terms of productivity, a configuration in which the first heating resistor Rh1 and the resistance temperature detector Rs are kept apart by a distance of a degree at which pollution does not occur and the first heating resistor Rh1 and the resistance temperature detector Rs are respectively coated with glass may also be adopted.

In a sensor element of a thermal flow meter that is configured in this manner, since the first heating resistor Rh1, the resistance temperature detector Rs, and the second heating resistor Rh2 are unitized and can be electrified via the support elements 23, 23 . . . , installation thereof is extremely simple. Further, in a case where an abnormality occurs in the sensor element, replacement thereof can be performed easily.

The adoption of multilayer substrate technology may also be considered as a separate configuration. FIG. 20 is a view that illustrates a configuration example of a multilayer substrate-type sensor element. In this structure, a plurality of resistors (electric conductors) are formed between layered insulating substrates 26. Although an example with four layers is shown in FIG. 20, the number of layers may be increased or decreased in accordance with the resistance value required for each resistor. In a case where resistors are formed in a manner in which the resistors extend over more than one layer, an electrical connection is made by utilizing a via hole 27 that is formed in the substrates 26. A point to which particular attention should be paid is the possibility that a pad portion 28 that serves as a connection point with the housing may deteriorate due to heat conduction from a heat-generating portion (second heating resistor Rh2) that is heated to a high temperature. It is necessary to adopt a design which ensures there is sufficient distance between the heat-generating portion Rh2 and the pad portion 28 or the like.

Figure 21:
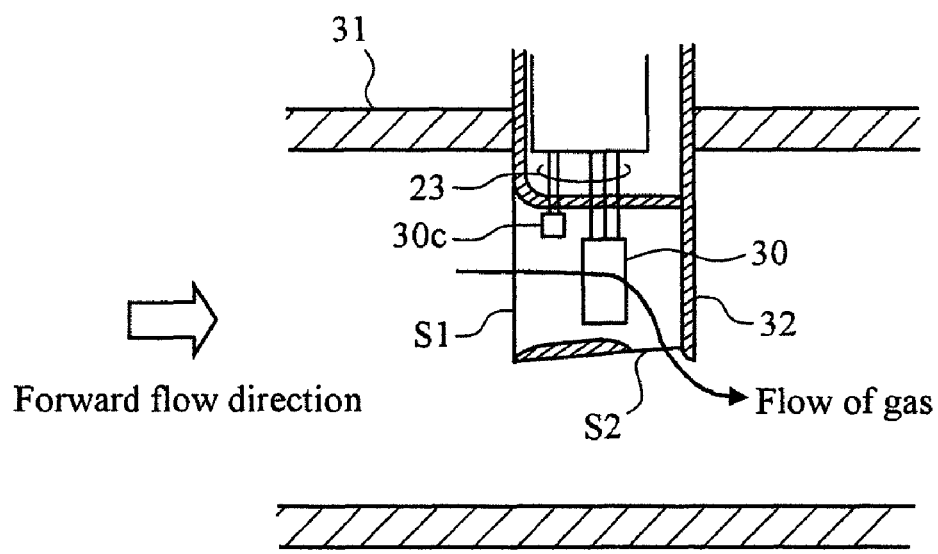
FIG. 21 is a sectional view showing a state in which a flow rate sensor of the present invention is mounted in an engine.

FIG. 21 is a view that illustrates an example in which the flow rate sensor of the present invention is mounted in an engine. In this figure, an example is shown in which a flow rate sensor is inserted from the side surface of an exhaust system piping 31 of an engine to measure the exhaust gas flow rate of the engine. The flow rate sensor includes a hot-wire type sensor element 30 as shown in FIG. 18, a resistance temperature detector 30c, a sensor element cover 32, and a support element 23 and the like. In this connection, in this figure, instead of a resistance temperature detector Rs inside the sensor element 30, the resistance temperature detector 30c is separately installed on the outside of the sensor element 30.

Figure 22:
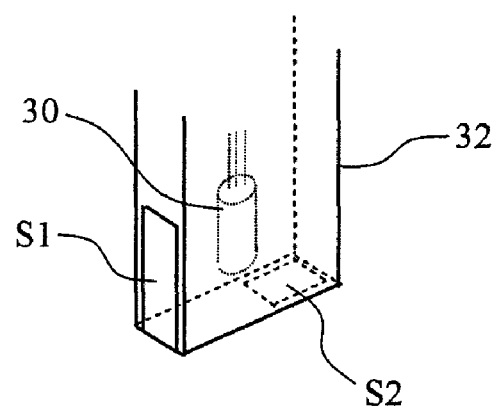
FIG. 22 is an oblique perspective view of a principal part of the flow rate sensor shown in FIG. 21.

An oblique perspective view of the sensor is shown in FIG. 22. In the sensor element cover 32, a surface S1 facing the forward flow direction of the gas and a portion S2 of the bottom are open. A gas flowing in the forward flow direction enters into the sensor from S1, passes over the surface of the sensor element 30, and exits from the opening portion S2 in the bottom of the sensor element cover 32. When the flow of a gas is in the reverse flow direction, it is difficult for the gas to enter the sensor because the opening portion S2 is in the bottom of the sensor element cover 32. More specifically, a structure is adopted whereby the sensor senses a gas flow in a forward flow direction, and a deterioration in the detection accuracy of a flow rate due to a reverse flow is prevented by decreasing the sensitivity to a flow in the reverse direction. There is also the effect that the flow of gas is made orderly by introducing the gas into a narrow passage inside the cover, and it is possible to decrease turbulence or a pulsing motion of the gas and thereby improve accuracy.

The resistance temperature detector 30c is an element that detects the temperature of a gas. Because the gas temperature increases due to the heat of the sensor element 30, it is desirable to dispose the resistance temperature detector 30c on the upstream side of the sensor element 30 and at a position that does not obstruct a gas flow that flows over the surface of the sensor element 30. Although according to the present example, the sensor element 30 and the resistance temperature detector 30c are disposed inside a single element cover 32, a configuration may also be adopted in which the resistance temperature detector 30c is independently arranged outside the element cover 32 at an arbitrary position in the gas flow path.

Figure 23:
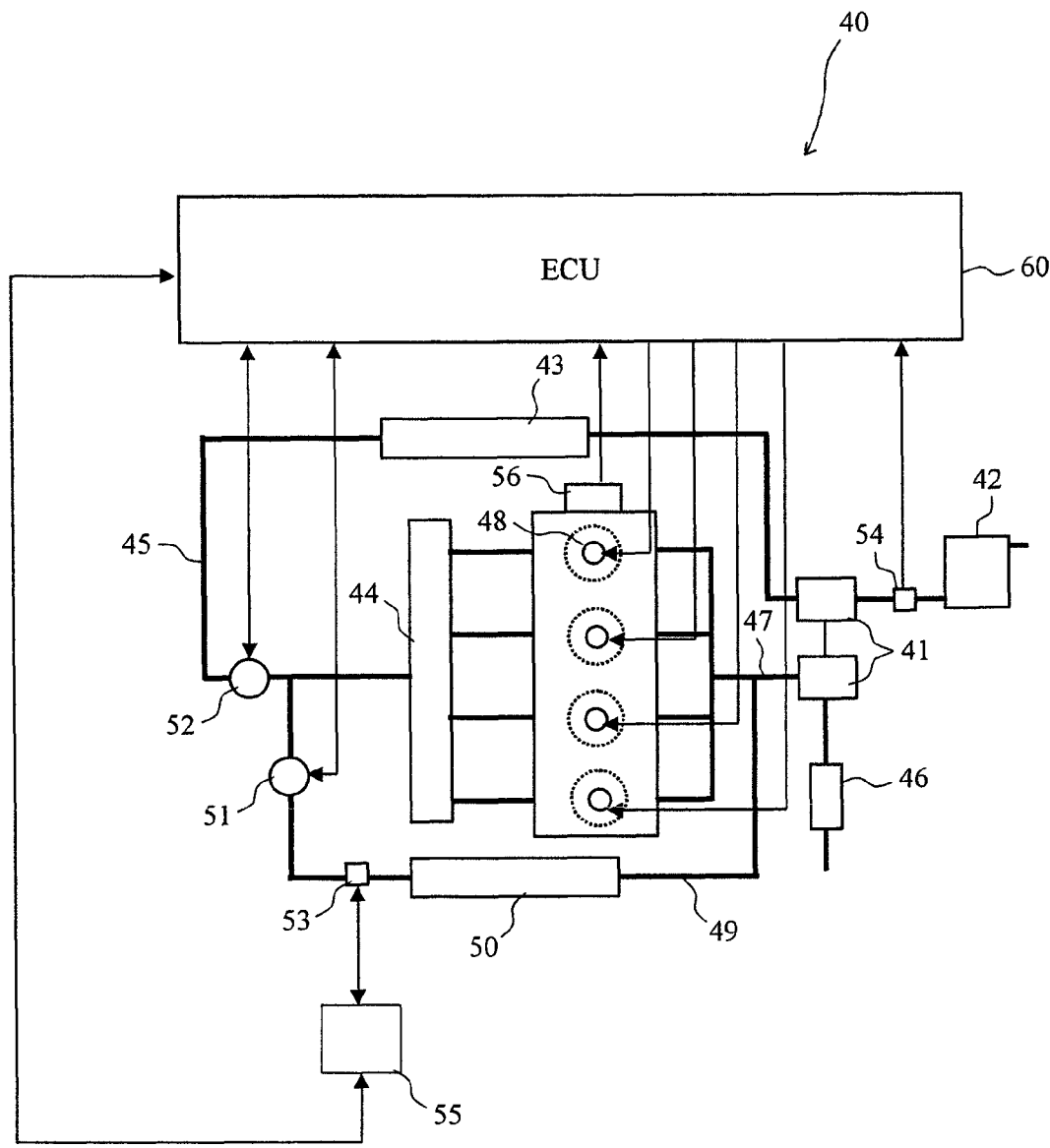
FIG. 23 is a configuration diagram of the fourth embodiment that illustrates an engine in which the flow rate sensor according to the present invention is mounted.

FIG. 23 is a view that illustrates a fourth embodiment that is a configuration example of an engine in which the flow rate sensor according to the present invention is mounted. The present configuration example is one in which the flow rate sensor of the present invention is applied to measurement of the flow rates of exhaust gas recirculation gas (EGR gas) of a diesel engine. An internal-combustion engine 40 is a 4-cycle, 4-cylinder diesel engine that comprises a turbo charger 41, and to which is connected an air intake passage 45 comprising an air cleaner 42, an inter cooler 43, an air intake manifold, a collector 44, and the like. An exhaust passage 47 comprising an exhaust manifold and a catalyst 46 and the like is also connected to the internal-combustion engine 40.

An injector 48 that injects fuel into a combustion chamber is provided in the internal-combustion engine 40. The injector 48 is fuel injection means that supplies fuel to the combustion chamber, and is disposed in each cylinder formed in the internal-combustion engine 40. An EGR cooler 50 is provided partway along a reflux piping 49 that circulates the EGR gas.

The EGR cooler 50 is cooling means that cools EGR gas that flows through the inside of the reflux piping 49. For example, a water-cooling type cooler is used as the EGR cooler 50, and the EGR gas that passes through the reflux piping 49 is cooled by circulation of cooling water. Any type of structure, such as a multi-layered type structure or a multi-tubular type structure, may be used for the EGR cooler 50.

An EGR control valve 51 is disposed on a downstream side of the EGR cooler 50 that is partway along the reflux piping 49. The EGR control valve 51 is a valve element that opens and closes the reflux piping 49, and reflux quantity of EGR gas is adjusted by opening or closing of the valve element. Although according to the present configuration example the EGR cooler 50 is disposed on the exhaust side, the dispositional relation between the EGR cooler 50 and the EGR control valve 51 is not particularly limited.

The air intake passage 45 and the reflux piping 49 are connected downstream of a throttle valve 52. A flow rate sensor 53 is provided partway along the reflux piping 49. Further, a flow rate sensor 54 is provided downstream of the air cleaner 42. The flow rate sensor 53 is a sensor for measuring the mass flow rate of EGR gas flowing through the reflux piping 49. The configuration of the flow rate sensor 53 is, for example, as shown in FIG. 18 and FIG. 21, one in which a sensor element having two heating resistors and a resistance temperature detector are disposed inside an element cover. The flow rate sensor 54 is a sensor for sensing the mass flow rate of fresh air that passes through the air intake passage. As the configuration thereof, a configuration may be considered in which a single heating resistor and a resistance temperature detector are disposed in an element cover (bypass passage), which is a configuration that is widely used in intake air flow meters of engines. Similarly to the flow rate sensor 53, a configuration may be adopted for the flow rate sensor 54 in which a sensor element having two heating resistors and a resistance temperature detector are disposed inside an element cover.

Although according to the present configuration example, the flow rate sensor 53 is disposed downstream of the EGR cooler 50, the flow rate sensor 53 may be disposed on the upstream side of the EGR cooler 50. In a case where the flow rate sensor 53 is disposed on the downstream side of the EGR cooler 50, since the EGR gas temperature is cooled by the EGR cooler 50, there is the advantage that the heat resistance of the flow rate sensor 53 may be relatively low. On the other hand, since the EGR gas temperature decreases, condensed water or oil mist is liable to occur in the gas and the flow rate sensor is liable to be dirtied by oil or various substances (for example, metallic materials used in brazing of the EGR cooler) that melted into the condensed water. In contrast, when the flow rate sensor is disposed upstream of the EGR cooler 50, although the heat resistance of the sensor needs to be greater, there is the advantage that the sensor is not liable to be dirtied.

The flow rate sensor 53 is connected to a flow rate sensor controller 55. In this case, the flow rate sensor controller 55 comprises a circuit that includes, as shown in FIG. 7, the microcomputer 12 for calculating and correcting a flow rate, heater driving circuits (10 and 11), fixed resistors (R1 to R3), low-pass filters (LP1 and LP2), and A/D converters (13 to 15). The flow rate sensor controller 55 performs heating temperature control of the heating resistors, reading of flow rate values or gas temperatures, and flow rate correction and the like. A flow rate detection value and a gas temperature detection value are sent to an engine control unit (ECU) 60. Control commands are sent from the ECU 60 to the flow rate sensor controller 55.

The ECU 60 also carries out intake air flow rate detection using the flow rate sensor 54, and detection of a rotation speed and a crank angle using a crank angle sensor 56. Based on the detected amounts for the EGR gas flow rate, EGR gas temperature, intake air flow rate, rotation speed and the like that are introduced into the ECU, the ECU 60 carries out centralized control of the entire engine including control of the fuel inject amount and injection timing of the injector 48 and valve opening control of the throttle valve 52 or EGR valve 51.

Figure 24:
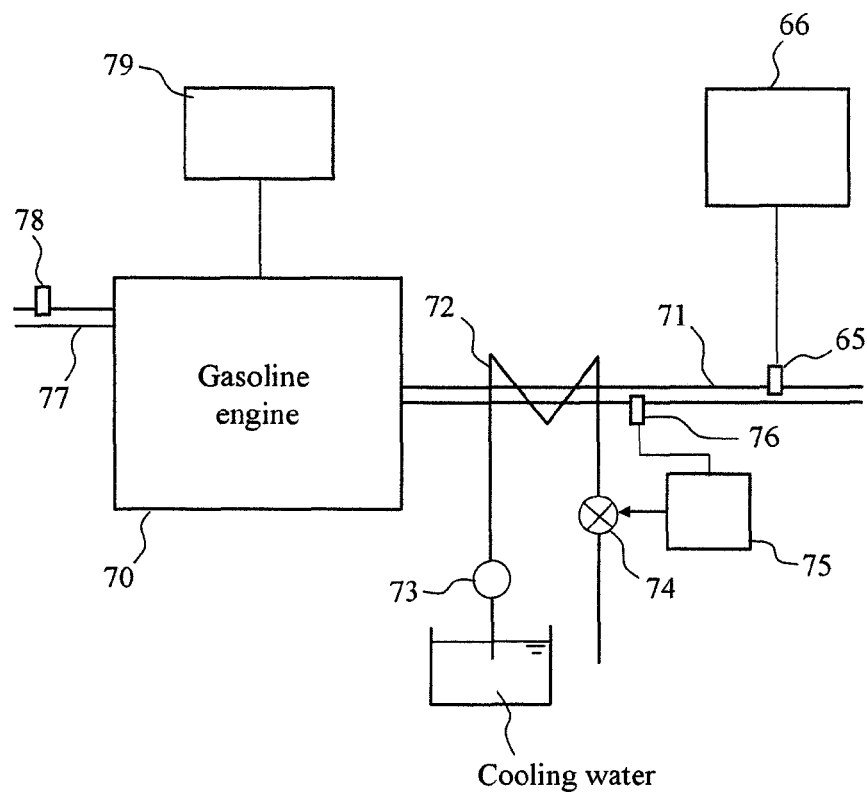
FIG. 24 is a configuration diagram of a fifth embodiment of the present invention in which the flow rate sensor of the present invention is applied to a gasoline engine, as the configuration of test equipment for verifying the advantages of the present invention.

A fifth embodiment of the present invention will now be described using FIG. 24 as a configuration of testing equipment for verifying the effect of the present invention. In FIG. 24, a flow rate sensor 65 is attached to an exhaust pipe 71 of a gasoline engine 70, and a flow rate sensor controller 66 performs temperature control of a heating resistor, reading of a flow rate value and a gas temperature, and flow rate correction according to present invention and the like. Exhaust gas inside the exhaust pipe 71 is cooled by a gas cooler 72. The gas cooler 72 comprises a cooling channel and a pump 73 that circulates cooling water. The exhaust gas temperature is detected by the temperature sensor 76, and the flow rate of the cooling water circulating in the gas cooler 72 is controlled by the cooler controller 75 so that the exhaust gas temperature is constantly maintained at a temperature that is greater than to the boiling point of water and less than the boiling point temperature of high-boiling components in the gasoline.

Table 1 shows typical components that are included in gasoline and their boiling points. Since the boiling points of decane and nonane that are high-boiling components of gasoline are 174° C. and 151° C., respectively, the exhaust gas temperature is set to be lower than the boiling point of these high-boiling components, for example, 140° C.

TABLE 1

| Component name | Chemical formula | Boiling point (° C.) |
|---|---|---|
| Hexane | $C_6H_{14}$ | 69 |
| Heptane | $C_7H_{16}$ | 98 |
| Octane | $C_8H_{18}$ | 126 |
| Nonane | $C_9H_{20}$ | 151 |
| Decane | $C_{10}H_{22}$ | 174 |

An airflow sensor 78 is arranged in an air intake pipe 77 of the gasoline engine to detect the amount of air that is taken into the engine 70. The number of revolutions of the gasoline engine 70 is maintained at a substantially constant number by the engine controller 79, and by increasing or decreasing the quantity of injected fuel the fuel-air ratio (ratio of fuel to air) inside an engine cylinder is set to various values.

In the engine system shown in FIG. 24, the fuel-air ratio (ratio of fuel to air) of the engine is changed to various values and the flow rates are measured by the flow rate sensor 65. The true exhaust gas flow rates are determined based on fuel injection quantities that are instructed by the airflow sensor 78 and the engine controller 79. Based on these values, errors in flow rates that are measured by the flow rate sensor 65 are determined.

Figure 25:
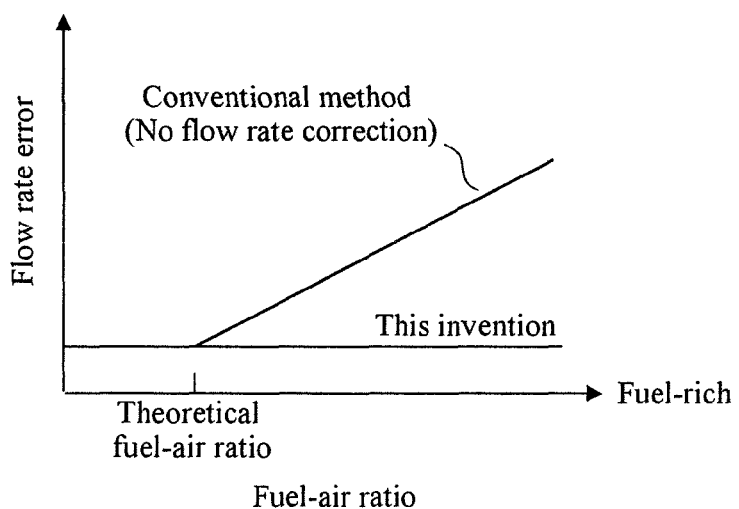
FIG. 25 is a graph that illustrates the relation of a flow rate error to a fuel-air ratio.

FIG. 25 is a view that illustrates the relation of flow rate errors measured by the flow rate sensor 65 to fuel-air ratios. In the conventional method in which the flow rate correction of the present invention is not performed, when the fuel-air ratio becomes greater than the theoretical fuel-air ratio (becomes fuel-rich), flow rate errors increase in a substantially linear manner accompanying increases in the fuel-air ratio. This is because, since the exhaust gas temperature is maintained at a lower temperature than the boiling point of high-boiling components of gasoline, the high-boiling components included in the gasoline condense and appear as mist-like liquid components and evaporate at the surface of the heating resistor of the flow rate sensor 65. When the liquid components of gasoline evaporate at the surface of the heating resistor, vaporized latent heat is taken from the heating resistor and a flow rate that is greater than the actual flow rate is detected.

As the fuel-air ratio increases, the proportion of unburned fuel in the exhaust gas grows, and since the concentration of liquid phase fuel components in the exhaust gas increases as a result, the quantity of liquid components evaporated at the heating resistor surface grows and flow rate detection errors increase. In contrast, according to the present invention, since flow rate errors produced by vaporized latent heat are corrected, flow rate errors do not increase even when the fuel-air ratio is fuel-rich in comparison to the theoretical mixture ratio, and it is thus possible to suppress errors to a substantially constant level.

Figure 26:
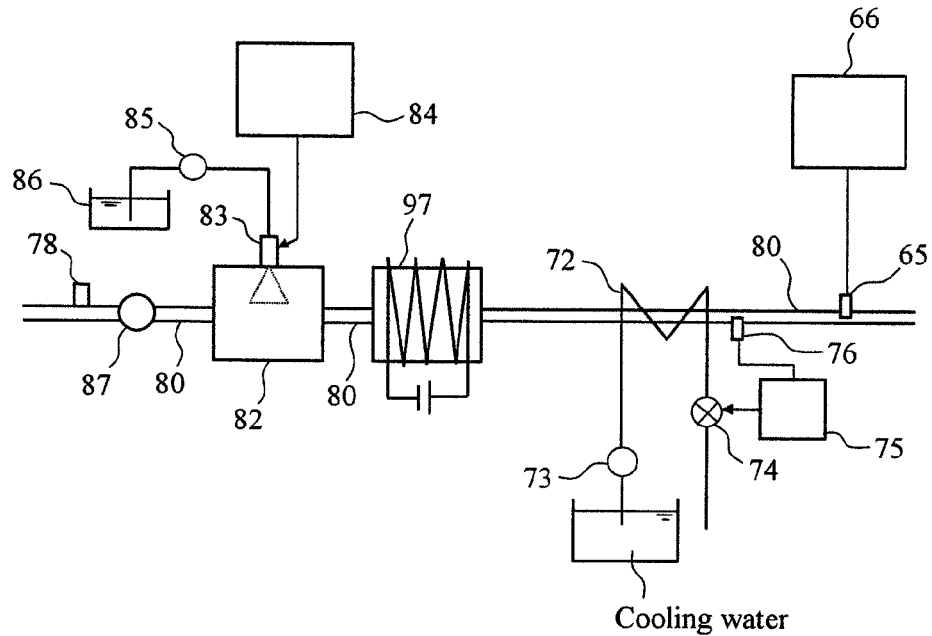
FIG. 26 is a configuration diagram of the sixth embodiment of the present invention in which the flow rate sensor of the present invention is applied to an apparatus that injects a gaseous mixture of water vapor/air, as the configuration of test equipment for verifying the advantages of the present invention.

Next, as the sixth embodiment of the present invention, a configuration of testing equipment using a gaseous mixture of water vapor/air is described using FIG. 26. In FIG. 26, air that is introduced into gas piping 80 by a pump 87 enters a chamber 82, and water is injected into the air by an injector 83. In this case, water that is fed from a tank 86 by a pump 85 is injected at a high pressure by the injector 83, and thus minute droplets are supplied into the air. The quantity of water that is injected from the injector is controlled by an injector controller 84.

A two-phase flow of water and air is heated to a temperature greater than or equal to the boiling point of water by a heater 97 to completely vaporize droplets in the air and thereby form a gaseous mixture of vapor and air. Thereafter, the gaseous mixture is cooled by a gas cooler 72. The temperature of the gaseous mixture is detected by a temperature sensor 76. The flow rate of cooling water circulating in the gas cooler 72 is controlled by a cooler controller 75 so as to keep the temperature of the gaseous mixture constant. The flow rate of the gaseous mixture is detected by the flow rate sensor 65 downstream of the gas cooler 72, and a flow rate sensor controller 66 performs temperature control of a heating resistor, reading of a flow rate value and a gas temperature, and flow rate correction and the like according to present invention.

In the gas flow rate measuring system shown in FIG. 26, the temperature of the gaseous mixture is changed to various values and the flow rates of the gaseous mixture are measured by the flow rate sensor 65. The true gaseous mixture flow rate is determined based on the water injection quantity that is instructed by the airflow sensor 78 and the injector controller 84. Based on these values, errors in flow rates measured by the flow rate sensor 65 are determined.

Figure 27:
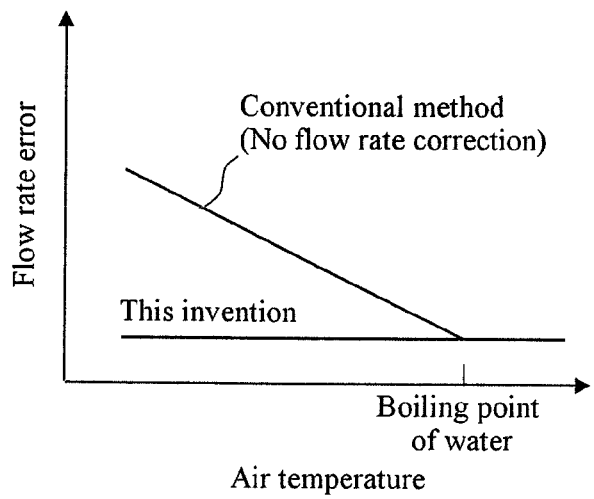
FIG. 27 is a graph that illustrates the relationship of flow rate errors to gaseous mixture temperatures.
Figure 28:
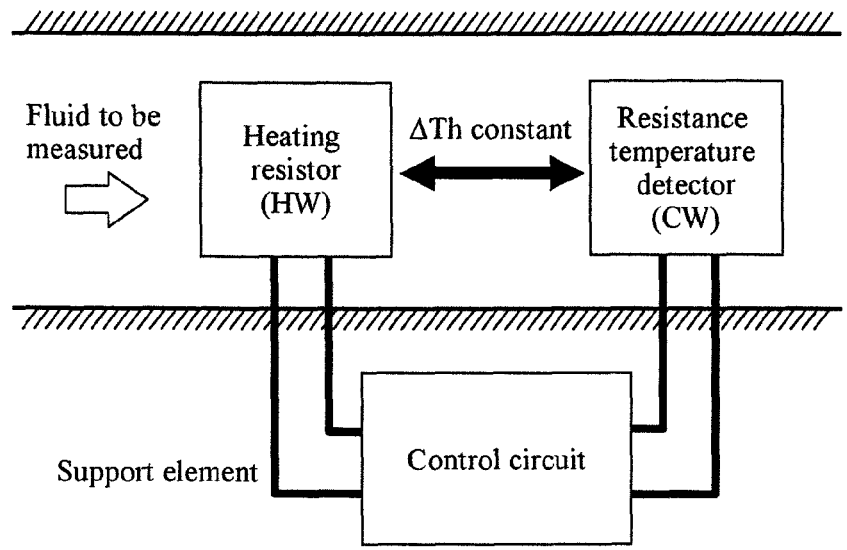
FIG. 28 is a schematic configuration diagram of a conventional thermal flow meter.

FIG. 27 is a view that illustrates the relation of flow rate errors measured by the flow rate sensor 65 to gaseous mixture temperatures. In the conventional method in which the flow rate correction of the present invention is not performed, when the gaseous mixture temperature falls below the boiling point of water, flow rate errors increase in accordance with the drop in the gaseous mixture temperature. This is because vapor in the gaseous mixture condenses when the gaseous mixture temperature drops below the boiling point of water and appears as mist-like liquid phase components, and these liquid phase components evaporate at the surface of the heating resistor of the flow rate sensor 65. When liquid components evaporate at the surface of the heating resistor, vaporized latent heat is taken from the heating resistor and a flow rate that is greater than the actual flow rate is detected. Since the concentration of liquid phase components in the gaseous mixture rises as the gaseous mixture temperature falls, the amount of evaporation at the surface of the heating resistor increases, and thus flow rate detection errors increase. In contrast, according to the present invention, since flow rate errors produced by vaporized latent heat are corrected, flow rate errors do not increase even when the gaseous mixture temperature becomes lower than the boiling point of water, and it is thus possible to suppress errors to a substantially constant level.

Embodiments of the present invention have been described in detail above. However, the present invention is not limited to the above described embodiments, and various design modifications can be made to the embodiments as described above to a degree that does not depart from the spirit and scope of the present invention that is described in the claims of the invention. For example, although a fourth power is described as an example that is proportional to an exponential value of a ratio between a first flow rate value and a second flow rate value with respect to a correction amount, naturally an exponential value such as a cube or a fifth power may be used.

As an example of applying the present invention, use of the thermal flow meter, thermal flow meter control method, and sensor element of a thermal flow meter enables accurate measurement of the flow rates of every kind of fluid, and it is possible to perform accurate flow rate measurement by mounting the thermal flow meter and sensor element thereof in piping or the like through which various fluids flow.

What is claimed is:

1. A thermal flow meter that applies a voltage to a heating resistor of a sensor element that is disposed in a gas flow to be measured to set the heating resistor to a predetermined temperature state, and detects a flow rate value of the gas flow to be measured in the predetermined temperature state that is set,
wherein the thermal flow meter corrects a flow rate detection error that is produced by vaporization of liquid phase components included in a gas flow to be measured of the flow rate value based on a value that is calculated using the flow rate value.

2. The thermal flow meter according to claim 1, wherein the flow rate value is a plurality of flow rate values that are detected in a plurality of different predetermined temperature states, and the thermal flow meter corrects a flow rate detection error produced by vaporization of liquid phase components included in a gas flow to be measured of one of the flow rate values based on the value that is calculated based on the plurality of flow rate values.

3. The thermal flow meter according to claim 2, wherein a value that is calculated based on the plurality of flow rate values is a ratio between the plurality of flow rate values.

4. The thermal flow meter according to claim 2, wherein a value that is calculated based on the plurality of flow rate values is an exponential value of a ratio between the plurality of flow rate values.

5. The thermal flow meter according to claim 2, wherein the plurality of different predetermined temperature states are temperature states that are produced by differing times of applying a voltage to the heating resistor.

6. The thermal flow meter according to claim 2, wherein the plurality of different predetermined temperature states are temperature states that are produced by applying different voltages to each of a plurality of the heating resistors.

7. A thermal flow meter that applies a voltage to a heating resistor of a sensor element that is disposed in a gas flow to be measured to set the heating resistor to a first temperature state and a second temperature state, and detects a first flow rate value of the gas flow to be measured in the first temperature state that is set and a second flow rate value of the gas flow to be measured in the second temperature state that is set,
wherein the thermal flow meter corrects a flow rate detection error that is produced by vaporization of liquid phase components included in a gas flow to be measured of the first flow rate value or the second flow rate value based on a ratio between the first flow rate value and the second flow rate value.

8. The thermal flow meter according to claim 7, wherein the first temperature state and the second temperature state are temperature states that are produced by differing times of applying a voltage to the heating resistor.

9. The thermal flow meter according to claim 7, wherein the first temperature state and the second temperature state are temperature states that are produced by applying a different voltage to each of a plurality of the heating resistors.

10. A method of controlling a thermal flow meter that applies a voltage to a heating resistor of a sensor element that is disposed in a gas flow to be measured to set the heating resistor to a predetermined temperature state, and detects a flow rate value of the gas flow to be measured in the predetermined temperature state that is set,
wherein the control method performs control to correct a flow rate detection error that is produced by vaporization of liquid phase components included in a gas flow to be measured of the flow rate value based on a value that is calculated using the flow rate value.

11. The method of controlling a thermal flow meter according to claim 10, wherein the control method perform control to detect a plurality of flow rate values in a plurality of different predetermined temperature states, calculate the value based on the flow rate values that are detected, and correct the flow rate detection error produced by vaporization of liquid phase components included in a gas flow to be measured of one of the flow rate values based on the value.

12. The method of controlling a thermal flow meter according to claim 11, wherein the control method performs control to calculate the value based on a ratio between the plurality of flow rate values and correct the flow rate detection error based on the value.

13. The method of controlling a thermal flow meter according to claim 11, wherein the control method performs control to calculate the value based on an exponential value of a ratio between the plurality of flow rate values, and correct the flow rate detection error based on the value.

14. The method of controlling a thermal flow meter according to claim 12, wherein the control method performs control to set the plurality of different temperature states by differing times of applying a voltage to the heating resistor and correct the flow rate detection error based on the value that is calculated using a flow rate value in a temperature state that is set.

15. The method of controlling a thermal flow meter according to claim 12, wherein the control method performs control to set the plurality of different temperature states by applying different voltages to each of a plurality of the heating resistors and correct the flow rate detection error based on the value that is calculated using a flow rate value in a temperature state that is set.

16. A method of controlling a thermal flow meter that applies a voltage to a heating resistor of a sensor element that is disposed in a gas flow to be measured to set the heating resistor to a first temperature state and a second temperature state, and detects a first flow rate value of the gas flow to be measured in the first temperature state that is set and a second flow rate value of the gas flow to be measured in the second temperature state that is set,
wherein the control method performs control to correct a flow rate detection error that is produced by vaporization of liquid phase components included in a gas flow to be measured of the first flow rate value or the second flow rate value based on a ratio between the first flow rate value and the second flow rate value.

17. The method of controlling a thermal flow meter according to claim 16, wherein the control method performs control to set the first temperature state and second temperature state by differing times of applying a voltage to the heating resistor and correct the flow rate detection error.

18. The method of controlling a thermal flow meter according to claim 16, wherein the control method performs control to set the first temperature state and second temperature state by applying a different voltage to each of a plurality of the heating resistors and correct the flow rate detection error.

* * * * *